US012198645B2

(12) United States Patent
Min

(10) Patent No.: US 12,198,645 B2
(45) **Date of Patent: *Jan. 14, 2025**

(54) DIMMING VALUE FILTERING DEVICE, IMAGE DATA PROCESSING DEVICE AND DISPLAY DEVICE FOR CONTROLLING LOCAL DIMMING

(71) Applicant: SILICON WORKS CO., LTD., Daejeon (KR)

(72) Inventor: Pil Jae Min, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,113

(22) Filed: Oct. 12, 2023

(65) Prior Publication Data

US 2024/0062732 A1 Feb. 22, 2024

Related U.S. Application Data

(63) Continuation of application No. 17/344,598, filed on Jun. 10, 2021, now Pat. No. 11,790,861.

(30) Foreign Application Priority Data

Jun. 16, 2020 (KR) ........................ 10-2020-0073002

(51) Int. Cl.
*G09G 3/34* (2006.01)

(52) U.S. Cl.
CPC ... *G09G 3/3426* (2013.01); *G09G 2320/0238* (2013.01); *G09G 2320/066* (2013.01); *G09G 2320/0686* (2013.01); *G09G 2360/16* (2013.01); *G09G 2380/10* (2013.01)

(58) Field of Classification Search
CPC ......... G09G 3/3426; G09G 2320/0686; G09G 2320/0238; G09G 2320/066; G09G 2380/10; G09G 2360/16
See application file for complete search history.

(56) References Cited

U.S. PATENT DOCUMENTS

| | | | | |
|---|---|---|---|---|
| 8,427,419 | B2 | 4/2013 | Ahn et al. | |
| 8,531,385 | B2 | 9/2013 | Kim et al. | |
| 8,547,404 | B2 | 10/2013 | Fujine et al. | |
| 8,681,088 | B2 | 3/2014 | Park | |
| 9,301,369 | B2 | 3/2016 | Yaras | |
| 2010/0074553 | A1 | 3/2010 | Choi et al. | |
| 2011/0141154 | A1 | 6/2011 | Ahn et al. | |
| 2011/0148941 | A1* | 6/2011 | Kim | G09G 3/3426 345/102 |
| 2012/0133685 | A1* | 5/2012 | Cho | G09G 3/3426 345/102 |
| 2013/0215161 | A1 | 8/2013 | Cho et al. | |

FOREIGN PATENT DOCUMENTS

| | | | |
|---|---|---|---|
| KR | 10-2014-0067394 | A | 6/2014 |
| KR | 10-1611913 | B1 | 4/2016 |
| KR | 10-2017-0040419 | A | 4/2017 |
| TW | 200721820 | A | 6/2007 |
| TW | 201440025 | A | 10/2014 |

* cited by examiner

*Primary Examiner* — Towfiq Elahi
(74) *Attorney, Agent, or Firm* — ROTHWELL, FIGG, ERNST & MANBECK, P.C.

(57) ABSTRACT

According to an embodiment, a contrast and deep black can be enhanced by differentially performing spatial filtering according to a position of a block of a video image.

18 Claims, 15 Drawing Sheets

*FIG. 10*

| | | |
|---|---|---|
| 0 | 0 | 0 |
| 0 | 1 | 0 |
| 0 | 0 | 0 |

M_corner

| | | |
|---|---|---|
| 0 | 0.15 | 0 |
| 0.15 | 0.40 | 0.15 |
| 0 | 0.15 | 0 |

M_edge

| | | |
|---|---|---|
| 0.04 | 0.12 | 0.04 |
| 0.12 | 0.36 | 0.12 |
| 0.04 | 0.12 | 0.04 |

M_center

DIMMING VALUE FILTERING DEVICE, IMAGE DATA PROCESSING DEVICE AND DISPLAY DEVICE FOR CONTROLLING LOCAL DIMMING

CROSS REFERENCE TO RELATED APPLICATION

This application is a Continuation of U.S. patent application Ser. No. 17/344,598 filed on Jun. 10, 2021, which claims priority from Republic of Korea Patent Application No. 10-2020-0073002, filed on Jun. 16, 2020, which is are hereby incorporated by reference in its their entirety.

BACKGROUND

1. Field of Technology

The present embodiment relates to a display technology for improving the contrast and deep black by efficiently controlling local dimming.

2. Description of the Prior Art

Among various components constituting an electronic device, the component that consumes the largest amount of power is the display device. The display device is continuously turned on while providing information to the user, and needs to continuously output light when turned on. Therefore, the display device consumes more power than any other components.

For this reason, electronic device manufacturers have continued research and development to reduce the amount of power consumed by the display device. Typical examples thereof include technologies for switching the display device to a standby mode, or turning on only a part of the display panel.

However, such technologies limit the amount of power consumed by the display device by restricting the user environment to some extent, and inevitably inconvenience the user to some extent.

Meanwhile, there has been ongoing development of a technology for reducing the amount of power consumed by the display device without changing the user environment, or with only a degree of environment change almost inconceivable by the user, and such a technology is epitomized by a local dimming technology.

Local dimming refers to a technology for driving a backlight partially at a different level of brightness. According to the local dimming, multiple backlight units (BLU) may divide the display panel into multiple regions and may emit light of different levels of brightness to the divided regions. The brightness of each backlight may be determined so as to be interlinked with the representative brightness value regarding the region to which light is emitted. The representative brightness value is obtained, according to the prior art, by deriving maximum greyscales of pixels in the region to which light is emitted, and then averaging the maximum greyscales.

However, such a conventional method may insufficiently process the deep black or real black, thereby lowering the contrast. Due to the low contrast and the difficulty in implementing deep black, it may be difficult to apply the conventional method to a place requiring a high level of contrast and complete black, such as the corner or edge of a cluster of a vehicle.

In addition, the region illuminated by backlights needs to be able to enhance the luminance or black in a predetermined environment, but the conventional method fails to provide flexibility in connection with whether the region needs to enhance luminance characteristics or black characteristics.

In addition, the area of the region illuminated by backlights is not constant and is irregular, and each region may thus have a different luminance. It is only after such area non-uniformity is reflected in the representative brightness value that an appropriate dimming value can be calculated, and efficiently dimming can be implemented.

In addition, spatial filtering may be performed with regard to the dimming value of one area of a video image, and the luminance of one area may become identical to the luminance of an adjacent region after this process. Identical luminance regarding one region may make it difficult to implement deep black or a high degree of contrast. Therefore, spatial filtering needs to be avoided in a region or a corner or an edge of a video image in which deep black or a high level of contrast is to be implemented. Accordingly, spatial filtering needs to be applied differentially to each region of the video image.

In this connection, the present embodiment seeks to provide a local dimming technology including a spatial filtering technique for implementing deep black or a high level of contrast.

SUMMARY OF THE INVENTION

In view of the above-mentioned background, an aspect of the present disclosure is to provide a local dimming technology for calculating a representative brightness value through black image data analysis which considers the relative importance of the black level in one block.

Another aspect of the present disclosure is to provide a local dimming technology capable of reinforcing luminance characteristics or black characteristics through a gamma variable during a process of considering the relative importance of the black level.

Still another aspect of the present disclosure is to provide a local dimming technology for calculating a representative brightness value by reflecting area non-uniformity between blocks of a video image.

Still another aspect of the present disclosure is to provide a local dimming technology for differentially performing spatial filtering according to the position of a block of a video image.

In an aspect, the present disclosure provides a dimming value filtering device for spatially filtering a dimming value for adjusting the brightness of each block of a backlight, the device comprising: a mask generating circuit configured to generate a plurality of masks different from each other; a mask application circuit configured to select one of the plurality of masks depending on a position of the block and to apply a selected mask to the block; a filtering result calculating circuit configured to calculate a filtered dimming value for the block according to the selected mask; and a transmitting and receiving circuit configured to transmit the filtered dimming value.

In connection with the dimming value filtering device, each mask comprises a plurality of coefficients and the filtering result calculating circuit uses the coefficients to calculate the filtered dimming value for the block.

In connection with the dimming value filtering device, the position of the block may be one of a center, an edge, and a corner of a video image.

In connection with the dimming value filtering device, the plurality of masks may include a center mask applied to a block positioned at the center of the video image, an edge mask applied to a block positioned at the edge of the video image, and a corner mask applied to a block positioned at the corner of the video image.

In connection with the dimming value filtering device, the mask may comprise a plurality of coefficients corresponding to the block and its neighboring blocks, and the filtering result calculating circuit may calculate the filtered dimming value by performing an arithmetic operation with respect to dimming values of the block and its neighboring blocks and the plurality of coefficients.

In connection with the dimming value filtering device, the filtering result calculating circuit may compare a result of the arithmetic operation with the dimming value before the arithmetic operation of the block, and, if the result of the arithmetic operation is larger than the dimming value before the arithmetic operation of the block, outputs the result of the arithmetic operation as the filtered dimming value.

In connection with the dimming value filtering device, the filtering result calculating circuit may compare the result of the arithmetic operation with the dimming value before the arithmetic operation of the block, and, if the result of the arithmetic operation is smaller than the dimming value before the arithmetic operation of the block, outputs the dimming value before the arithmetic operation of the block as the filtered dimming value.

In connection with the dimming value filtering device, the neighboring blocks may comprise horizontal blocks horizontally adjacent to the block, vertical blocks vertically adjacent to the block, and corner blocks diagonally adjacent to the block.

In connection with the dimming value filtering device, the plurality of coefficients may comprise a center coefficient corresponding to the block, horizontal coefficients corresponding to the horizontal blocks, vertical coefficients corresponding to the vertical blocks, and corner coefficients corresponding to the corner blocks.

In connection with the dimming value filtering device, the center coefficient may have a value greater than the horizontal coefficients, the vertical coefficients, and the corner coefficients.

In connection with the dimming value filtering device, the filtering result calculating circuit may calculate the filtered dimming value by multiplying the dimming value of the block and the center coefficients, respectively multiplying the dimming values of the horizontal blocks and the horizontal coefficients, respectively multiplying the dimming values of the vertical blocks and the vertical coefficients, respectively multiplying the dimming values of the corner blocks and the corner coefficients, and subsequently summing up all the results of the multiplications.

In connection with the dimming value filtering device, the plurality of masks may comprise a center mask applied to a block positioned at the center of a video image, edge masks applied to blocks positioned at edges of the video image, and corner masks applied to blocks positioned at corners of the video image, and the center coefficient of the corner mask may have a larger value than the center coefficients of the center mask and the edge mask.

In connection with the dimming value filtering device, the plurality of masks may comprise a center mask applied to a block positioned at the center of a video image, edge masks applied to blocks positioned at edges of the video image, and corner masks applied to blocks positioned at corners of the video image, and the center coefficient of the center mask may have a smaller value than the center coefficients of the corner mask and the edge mask.

In connection with the dimming value filtering device, the mask application circuit may designate a region, for which filtering is to be performed, in a video image and apply one of the plurality of masks to a block included in the region.

In connection with the dimming value filtering device, the mask application circuit may apply different masks to respective blocks included in the region according to positions of the respective blocks included in the region.

In connection with the dimming value filtering device, the region may be previously determined and stored.

Another embodiment provides an image data processing device including: a block acquisition circuit configured to divide a video image into a plurality of regions and to designate each region as blocks; a dimming value calculating circuit configured to calculate a brightness value of each block and to calculate a dimming value for adjusting the brightness of a backlight corresponding to the block according to the brightness value; a dimming value filtering device configured to receive the dimming value, to generate a plurality of masks, to select one of the plurality of masks according to a position of the block in the video image, and to apply a selected mask to the block to calculate a filtered dimming value; and a dimming output circuit configured to output a dimming control signal, for driving the backlight according to the dimming value, to a backlight driving device.

In connection with the image data processing device, the dimming value filtering device may designate a region of interset and filter a dimming value of a block positioned outside the region of interest such that differences between the dimming value of the block positioned outside the region of interest and dimming values of adjacent neighboring blocks decrease.

In connection with the image data processing device, the dimming value filtering device may designate a region of interest and filter a dimming value of a block included in the region of interest such that differences between the dimming value of the block positioned within the region of interest and dimming values of adjacent neighboring blocks increase.

In connection with the image data processing device, the mask may comprise a plurality of coefficients in the form of a matrix, the plurality of coefficients being used for arithmetic operations with respect to the dimming values of the block and its neighboring blocks.

As described above, according to the present disclosure, a high level of contrast and deep black can be implemented.

In addition, according to the present disclosure, black characteristics and luminance characteristics of a block can be selectively reinforced, thereby flexibly adjusting a black and luminance.

In addition, according to the present disclosure, efficient local dimming can be provided by variously considering optical characteristics such as block area non-uniformity.

BRIEF DESCRIPTION OF THE DRAWINGS

FIG. 10 is an exemplary diagram illustrating a mask used for spatial filtering according to another embodiment;

DETAILED DESCRIPTION OF THE EXEMPLARY EMBODIMENTS

Figure 1:
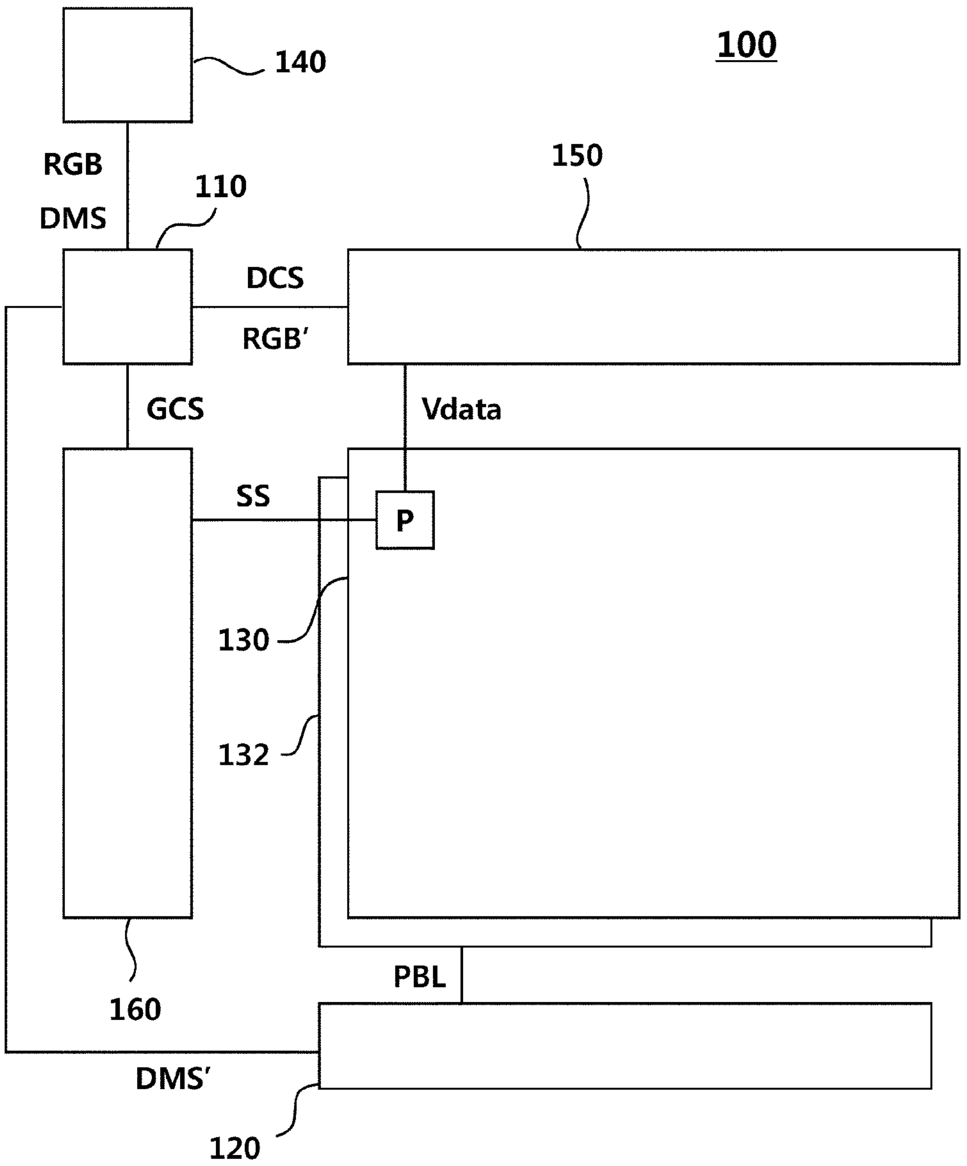
FIG. 1 is a configuration diagram of a display device according to an exemplary embodiment.

FIG. 1 is a configuration diagram of a display device according to an exemplary embodiment.

Referring to FIG. 1, the display device 100 may include a host 140, an image data processing device 110, a data driving device 150, a gate driving device 160, a display panel 130, a backlight driving device 120 and the like.

The host 140 may recognize a user operation, and may generate image data or a dimming control signal according to the user operation.

Image data in the display device 100 may be converted into various formats. In order to distinguish between the image data and the converted image data, hereinafter, image data generated and transmitted by the host 140 is referred to as original image data RGB, and image data generated and transmitted by the image data processing device 110 is referred to as converted image data RGB'. In addition, a dimming value included in the dimming control signal in the display device 100 may be adjusted. In order to distinguish between pre-adjustment and post-adjustment dimming control signals, hereinafter, a dimming control signal generated and transmitted by the host 140 is referred to as a pre-adjustment dimming control signal DMS, and a dimming control signal generated and transmitted by the image data processing device 110 is referred to as the post-adjustment dimming control signal DMS'.

When looking at a signal flow, the image data, which is generated by the host 140, is converted by the image data processing device 110, and then is transmitted to the data driving device 150. Further, the dimming control signal, which is generated by the host device 140, is adjusted by the image data processing device 110, and then is transmitted to the backlight driving device 120.

The image data processing device 110 is a device configured to convert the image data and adjust the dimming control signal.

The image data processing device 110 may analyze original image data RGB for a plurality of pixels P arranged on the display panel 130, and may calculate the representative brightness value for the plurality of pixels P. Since the plurality of pixels P have different brightness values, the image data processing device 110 calculates a representative brightness value capable of representing the plurality of pixels P. The representative brightness value may be, for example, the average brightness value of the plurality of pixels P. Alternatively, the representative brightness value may be, for example, the mode brightness value of the plurality of pixels P or the maximum brightness value thereof. The image data processing device 110 may calculate the representative brightness value for the plurality of pixels P by using a method known as a cumulated density function (CDF) or an average pixel level (APL). The representative brightness value may include a value relating to the CDF or APL.

The image data processing device 110 may calculate an adjusted dimming value for driving a backlight 132 according to the representative brightness value or a corrected representative brightness value. Here, the dimming value may be understood as a dimming brightness value. The greater the dimming value, the greater the brightness value of the backlight 132. For example, if the dimming value is 100%, the backlight 132 may be driven at the maximum brightness, and if the dimming value is 0%, the backlight 132 may be driven at the minimum brightness or the backlight 132 may be turned off.

The image data processing device 110 may decrease the adjusted dimming value of the backlight 132 as the representative brightness value decreases. In other words, the image data processing device 110 may lower the brightness of the backlight 132 as the representative brightness value decreases.

The image data processing device 110 may convert the original image data RGB in order to compensate for a greyscale of each pixel according to the adjusted dimming value. The image data processing device 110 may calculate a factor called a gain, convert the original image data RGB by using the gain, and compensate for a greyscale. As the dimming value is adjusted, the brightness (or luminance) of the pixel may differ. However, if a greyscale displayed by pixels is adjusted using a gain depending on the adjusted dimming value, the pixels may maintain original brightness. For example, the image data processing device 110 may convert the original image data RGB so that the greyscale of each pixel increases as the adjusted dimming value decreases. Then, the brightness of each pixel can be maintained as it is. Here, the gain may have a characteristic of increasing the greyscale. The rate of decrease of the dimming value and the rate of increase of the greyscale of the pixel may be different from each other, and the same may be different according to a pixel level.

The image data processing device 110 may generate an adjusted dimming control signal DMS' according to the adjusted dimming value, and may output the adjusted dimming control signal DMS' to the backlight driving device 120.

Meanwhile, a plurality of pixels P may be arranged on the display panel 130, and a data line and a gate line connected to the plurality of pixels P may be arranged thereon. The gate driving device 160 may transmit a scan signal SS to a gate line to connect each pixel P to a data line, and the data driving device 150 may supply, to a data line, a data voltage Vdata corresponding to image data, so as to drive each pixel P.

The image data processing device 110 may transmit a gate control signal GCS to the gate driving device 160 and transmit a data control signal DCS to the data driving device 150, thereby controlling a driving timing related to each pixel P. In this aspect, the gate driving device 160 is referred to as a gate driver GDIC, the data driving device 150 is referred to as a source driver SDIC, and the image data processing device 110 is referred to as a timing controller TCON.

The backlight 132 may be disposed in the background of the display panel 130, and the backlight 132 may be driven by the backlight driving device 120.

The backlight driving device 120 may control the brightness of light sources configuring the backlight 132. The light sources may be, for example, a fluorescent lamp (FL) series or a light emitting diode (LED) series.

The backlight driving device 120 may control dimming of the backlight 132. For example, the backlight driving device 120 may control dimming of the backlight 132 by using an analog dimming technique for reducing the amount of power PBL supplied to the backlight 132 while continuously driving the backlight 132. As another example, the backlight driving device 120 may control dimming of the backlight 132 by using a pulse width modulation (PWM) technique for adjusting the ratio between a turn-on time and a turn-off time while discontinuously driving the backlight 132. According to an embodiment, the PWM technique may be a scheme of controlling the brightness of the backlight, depending on a PWM signal, by the amount of voltage charged at a capacitor or the like.

In the analog dimming technique, the dimming control signals DMS and DMS' may have the form of analog voltage or analog current, and in the PWM technique, the dimming control signals DMS and DMS' may have the form of PWM signals.

Figure 2:
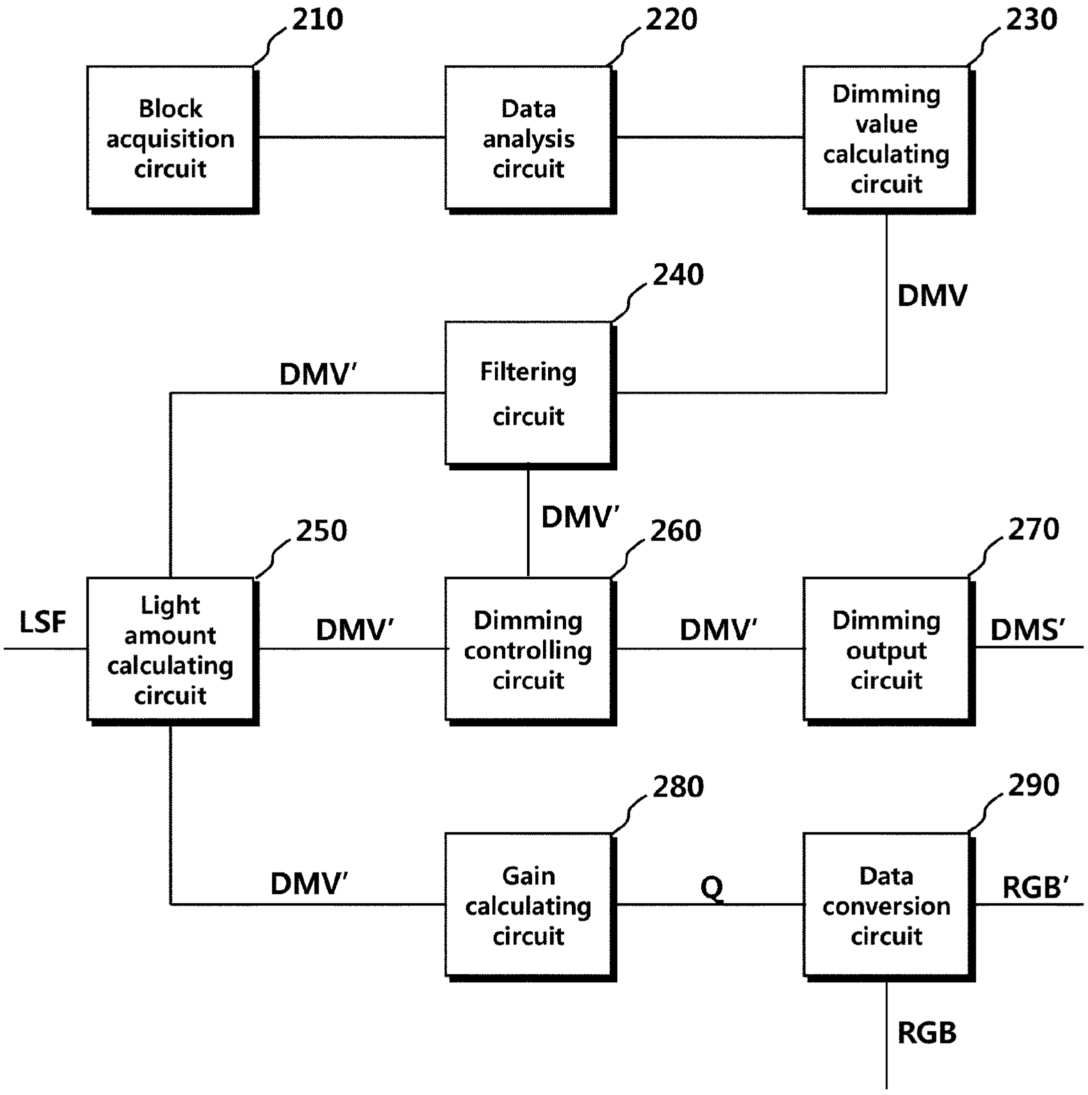
FIG. 2 is a configuration diagram of an image data processing device according to an exemplary embodiment.

FIG. 2 is a configuration diagram of an image data processing device according to an embodiment.

Referring to FIG. 2, the image data processing device 110 may include a block acquisition circuit 210, a data analysis circuit 220, a dimming value calculating circuit 230, a filtering circuit 240, and a light amount calculating circuit 250, a dimming controlling circuit 260, a dimming output circuit 270, a gain calculating circuit 280, and a data conversion circuit 290.

The block acquisition circuit 210 may receive a video image and acquire a plurality of blocks relating to the video image. A block is a part of a video image displayed on the display panel 130 and may denote a region or a segment. A block is a unit by which the backlight irradiates light, and the backlight may irradiate light by using different amounts of light for each block. The backlight may control dimming by using a different dimming value for each block of the video image.

The data analysis circuit 220 may calculate a representative brightness value for one block by analyzing original image data RGB for a video image including a plurality of blocks. The data analysis circuit 220 may calculate a representative brightness value for R original image data, G original image data, and B original image data in order to generate an appropriate dimming value for local dimming. The representative brightness value may include an average pixel level (APL). The representative brightness value may include an average value, a median value, or a value obtained by applying a histogram or pooling process.

For example, the data analysis circuit 220 may use, as the representative brightness value, the largest value among R original image data, G original image data, and B original image data. Alternatively, the data analysis circuit 220 may use, as the representative brightness value, a value obtained by applying an appropriate weight to the R original image data, G original image data, and B original image data and summing all the results of the application. Alternatively, the data analysis circuit 220 may use, as the representative brightness value, a value by which original image data RGB is mapped to a specific curve.

The data analysis circuit 220 may reflect, in the representative brightness value, the relative importance of black image data included in the one block, so as to correct the representative brightness value. The data analysis circuit 220 may correct the representative brightness value by using a gamma variable for adjusting the relative importance of the black image data.

The data analysis circuit 220 may reflect the area non-uniformity between blocks in the corrected representative brightness value, so as to re-correct the corrected representative brightness value. The area of each block of the video image displayed on the display panel 130 may be different. For example, in a video image displayed on a vehicle instrument cluster, the area of the center block may be larger than the area of the corner or edge block. In addition, the area of the edge block may be larger than the area of the corner block.

The dimming value calculating circuit 230 may calculate a dimming value. The dimming value calculating circuit 230 may calculate an initial dimming value DMV for each region according to the representative brightness value. The dimming value calculating circuit 230 may calculate an initial dimming value DMV for the representative brightness value by using a log function, an exponential function, or a user function. Here, the dimming value calculating circuit 230 may calculate the initial dimming value DMV according to the re-corrected representative brightness value in which the relative importance of black image data and the area non-uniformity between blocks are reflected.

The filtering circuit 230 may filter the dimming value. The filtering circuit 230 may adjust the initial dimming value DMV by means of filtering, so as to generate the filtered dimming value DMV'. The filtering circuit 230 may perform spatial filtering. Since initial dimming values DMVs relating to a plurality of regions of the video image are different from each other and thus there is a deviation, and the filtering circuit 230 may adjust the deviation. Mainly, when the initial dimming value DMV of one block is smaller than the initial dimming value DMV of a neighboring block, the filtering circuit 240 may make the deviation smaller by increasing the initial dimming value DMV of the one block. Alternatively, when the initial dimming value DMV of the one block is greater than the initial dimming value DMV of a neighboring block, the filtering circuit 240 may reduce the initial dimming value DMV of the one block so as to reduce the deviation. Therefore, the filtering circuit 240 can prevent artifacts caused by the deviation.

The filtering circuit 240 may use a weighted sum in order to adjust the dimming value. The filtering circuit 240 may receive the weighted sum back and generate a new weighted sum to perform stable filtering.

In addition, the filtering circuit 230 may perform temporal filtering. The filtering circuit 230 may adjust the inter-frame deviation regarding the dimming value by means of temporal filtering. The dimming value may be changed between a current frame and a next frame, and the filtering circuit 230 may reduce a deviation between the dimming value of the current frame and the dimming value of the next frame. The filtering circuit 230 may prevent flickering that occurs as a deviation in dimming values between frames increases.

The light amount calculating circuit 250 may calculate the light amount of the backlight, and may transmit the calculated light amount to a gain calculating circuit 280 in order to reflect the light amount in the gain calculation. The light amount calculating circuit 250 may calculate the amount of light by using a light spread function (LSF) and the filtered dimming value DMV'.

The dimming controlling circuit 260 may finally determine a dimming value. The dimming controlling circuit 260 may determine the filtered dimming value DMV' as the final dimming value. The dimming controlling circuit 260 may transmit the filtered dimming value DMV' to the dimming output circuit 270. When there is a condition to be reflected in order to determine the dimming value, the dimming controlling circuit 260 may adjust the filtered dimming value DMV' by reflecting the condition, and may determine the adjusted filtered dimming value DMV' to be the final dimming value.

The dimming output circuit 270 may convert the dimming value into a dimming control signal and output the dimming control signal to the backlight driving device. The dimming output circuit 270 may convert the filtered dimming value DMV' into an adjusted dimming control signal DMS'. The input dimming control signal and the adjusted dimming control signal DMS' are preferably of the same type. To this end, the dimming output circuit 270 may control the cycle or frequency of the adjusted dimming control signal DMS' so as to match with the cycle or frequency of the input dimming control signal.

The gain calculating circuit 280 may calculate a gain Q for compensating for the original image data RGB according to a dimming value. The gain calculating circuit 280 may receive the filtered dimming value DMV' from the light amount calculating circuit 250, and may calculate gain Q for compensating for the original image data RGB according to the filtered dimming value DMV'. Specifically, despite the changed greyscale of the original image data RGB and the filtered dimming value DMV', the gain Q may be a factor necessary for the pixels to produce the same luminance.

The data conversion circuit 290 may generate the converted image data RGB' from the original image data RGB by using the gain Q. The data conversion circuit 290 may apply the finally determined gain Q to the R image data, G image data, and B image data, so as to generate the converted image data RGB'.

Figure 3:
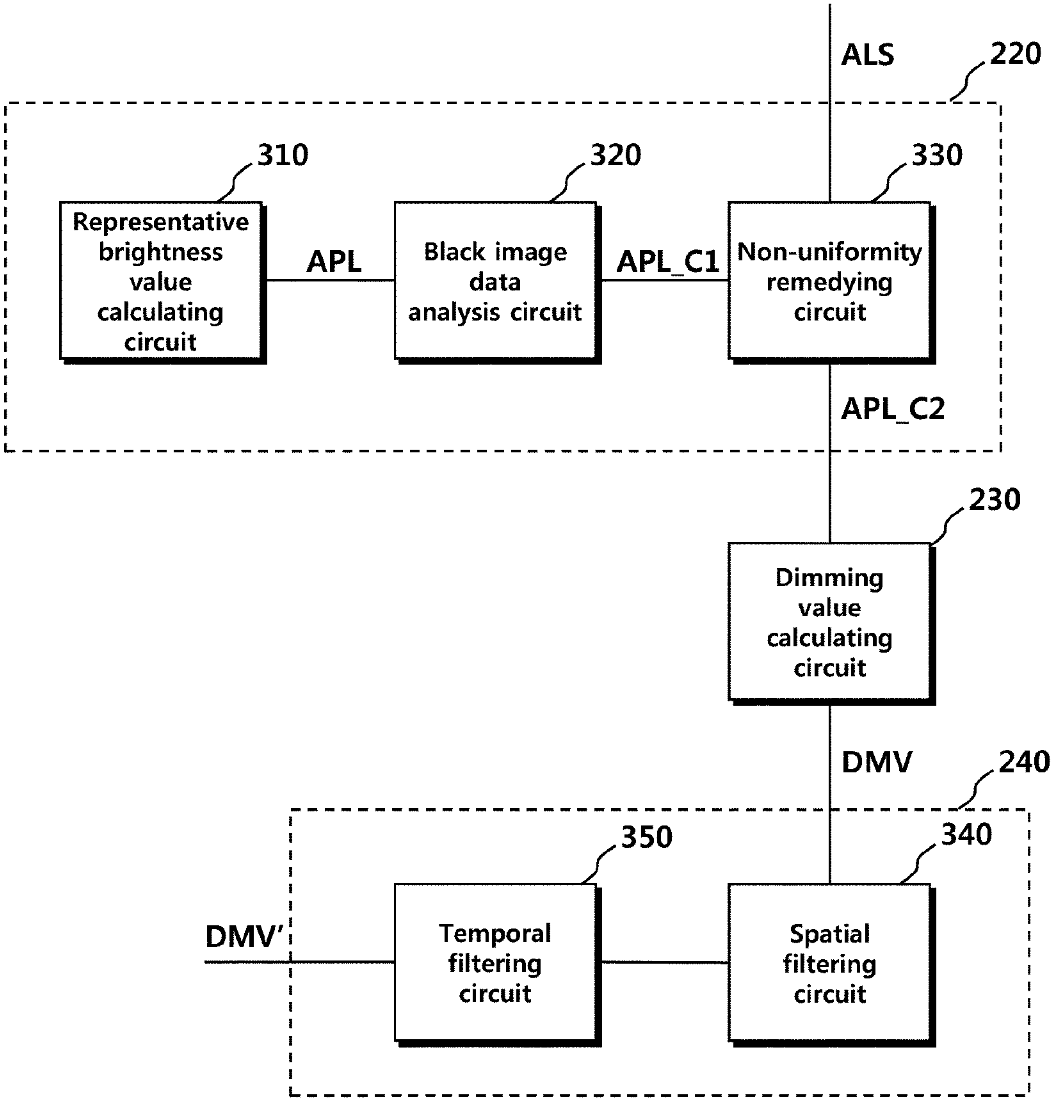
FIG. 3 is a configuration diagram of a data analysis circuit and a filtering circuit according to an embodiment.

FIG. 3 is a configuration diagram of an image data processing device according to an embodiment.

Referring to FIG. 3, the data analysis circuit 220 may include a representative brightness value calculating circuit 310, a black image data analysis circuit 320, and a non-uniformity remedying circuit 330.

The representative brightness value calculating circuit 310 may calculate a representative brightness value for one block of a video image displayed on the display panel 130. The representative brightness value calculating circuit 310 may use APL as the representative brightness value. The representative brightness value calculating circuit 310 may calculate the APL through averaging the maximum greyscales of the pixels of one block.

The representative brightness value calculating circuit 310 may generate histogram data by making a histogram of the original image data RGB, or may generate cumulated density function (CDF) data by accumulating the histogram data. The representative brightness value calculating circuit 310 may calculate APL according to the histogram data or cumulated density function (CDF) data.

The black image data analysis circuit 320 may reflect the relative importance of the black image data in the representative brightness value so as to generate the corrected representative brightness value. For example, the black image data analysis circuit 320 may reflect the relative importance of the black image data in the APL so as to generate the corrected APL (APL_C1).

The black image data analysis circuit 320 may generate a corrected representative brightness value by adjusting a gamma variable for controlling the relative importance of the black image data. Here, the relative importance of the black image data may include a ratio of the number of pixels displaying black in relation to the total number of pixels included in one block.

The black image data analysis circuit 320 may increase or decrease the corrected representative brightness value according to whether the value of the gamma variable is larger or smaller than a specific value.

The black image data analysis circuit 320 may use a gamma curve in order to obtain the corrected representative brightness value. The gamma curve may have a different shape depending on the gamma variable. In addition, the gamma curve may be formed using values stored in a lookup table (LUT).

The non-uniformity remedying circuit 330 may reflect the area non-uniformity between one block and another block in the corrected representative brightness value, so as to generate a re-corrected representative brightness value. For example, the non-uniformity remedying circuit 330 may reflect a ratio of the area of one block to the area of another block in the corrected APL (APL_C1), so as to generate the re-corrected APL (APL_C2). The non-uniformity remedying circuit 330 may use illuminance data ALS including illuminance information in order to generate the re-corrected APL (APL_C2).

When the variance of the levels of all pixels included in one block satisfies a condition, the non-uniformity remedying circuit 330 may determine, as the re-corrected representative brightness value, the corrected representative brightness value as it is. That is, the non-uniformity remedying circuit 330 may not reflect a factor in the corrected representative brightness value. Here, the level of the pixel may include a greyscale indicated by a pixel.

The non-uniformity remedying circuit 330 may reflect the area non-uniformity between one block and another block in the corrected representative brightness value, so as to generate a re-corrected representative brightness value. When the variance of the levels of all pixels included in a block satisfies a condition, the non-uniformity remedying circuit 330 may reflect a factor in the corrected representative brightness value and determine a result thereof as a re-corrected representative brightness value. The factor will be described later.

When the non-uniformity remedying circuit 330 transfers the re-corrected APL (APL_C2) to the dimming value calculating circuit 230, the dimming value calculating circuit 230 may generate an initial dimming value DMV and transfer the same to the filtering circuit 240.

The filtering circuit 240 may include a spatial filtering circuit 340 and a temporal filtering circuit 350. The filtering circuit 240 may generate and output the filtered dimming value DMV' by means of filtering of the initial dimming value DMV.

The spatial filtering circuit 340 may make the luminance of a block to be uniform by adjusting deviations in dimming values related to a plurality of blocks of a video image.

The temporal filtering circuit 350 may filter the dimming value such that the dimming value changes smoothly to a target dimming value. The temporal filtering circuit 350 may smoothly change the dimming value to prevent flickering that occurs when a dimming value of one frame has a large deviation from a dimming value of a previous frame.

Figure 4:
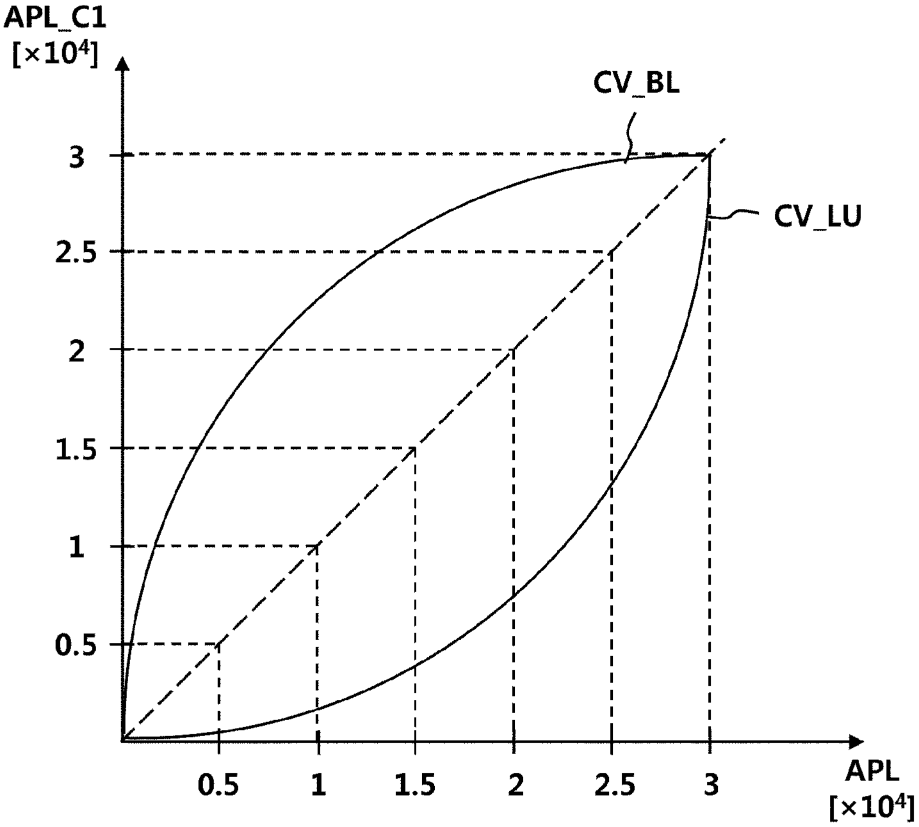
FIG. 4 is an exemplary diagram of a gamma curve for explaining that the relative importance of black image data is reflected in a representative brightness value according to an exemplary embodiment.

FIG. 4 is an exemplary diagram of a gamma curve for explaining that the relative importance of black image data is reflected in a representative brightness value according to an exemplary embodiment.

Referring to FIG. 4, a black image data analysis circuit of a data analysis circuit may use a gamma variable and a gamma curve depending on the gamma variable in order to generate a corrected representative brightness value in which the relative importance of the black image data is reflected.

The black image data analysis circuit may correct the representative brightness value by reflecting the relative importance of the black image data in the representative brightness value through Equation 1 including a gamma variable. APL is used as the representative brightness value, and this process may be performed independently for each block.

$$APL\_C1 = APL*\left(1-\left(\frac{\#\text{ black pixels}}{\#\text{ pixels}}\right)^{\gamma}\right) \quad \text{[Equation 1]}$$

Here, APL may denote a representative brightness value, and APL_C1 may denote a corrected representative brightness value, respectively. The ratio of the number of black pixels (# black pixels) to the total number of pixels (# pixels) included in one block may denote the relative importance of the black image data. The gamma variable (γ) may control the ratio above.

If the gamma variable is less than 1, the corrected representative brightness value may decrease, and if the gamma variable is greater than 1, the corrected representative brightness value may increase. The value of the gamma variable may be determined by a user configuration. When a user configures the gamma variable to be smaller than 1 in order to enhance the black characteristic of one block, the black image data analysis circuit may emphasize the black characteristic by decreasing the corrected representative brightness value. Alternatively, if the user configures the gamma variable to be greater than 1 in order to enhance the luminance characteristics of one block, the black image data analysis circuit may emphasize the luminance characteristics by increasing the corrected representative luminance value.

The black image data analysis circuit may use a gamma curve according to a gamma variable in order to generate a corrected representative brightness value. The gamma curve may be formed using values stored in a lookup table.

For example, if the gamma variable is less than 1 and thus the black characteristic is emphasized, the black image data analysis circuit may use the black gamma curve CV_BL. The black image data analysis circuit may generate a corrected APL (APL_C1) by matching the APL to the black gamma curve CV_BL. Alternatively, when the gamma variable is greater than 1 and thus the luminance characteristic is emphasized, the black image data analysis circuit may use the luminance gamma curve CV_LU. The black image data analysis circuit may generate a corrected APL (APL_C1) by matching the APL to the luminance gamma curve CV_LU.

Depending on whether a user emphasizes the black characteristic or the luminance characteristic, the gamma variable and the corresponding gamma curve may be adjusted, and at the same time, the corrected representative brightness value may be adjusted differently. Accordingly, control flexibility and degree of freedom between the black characteristic and the luminance characteristic can be increased.

Figure 5:
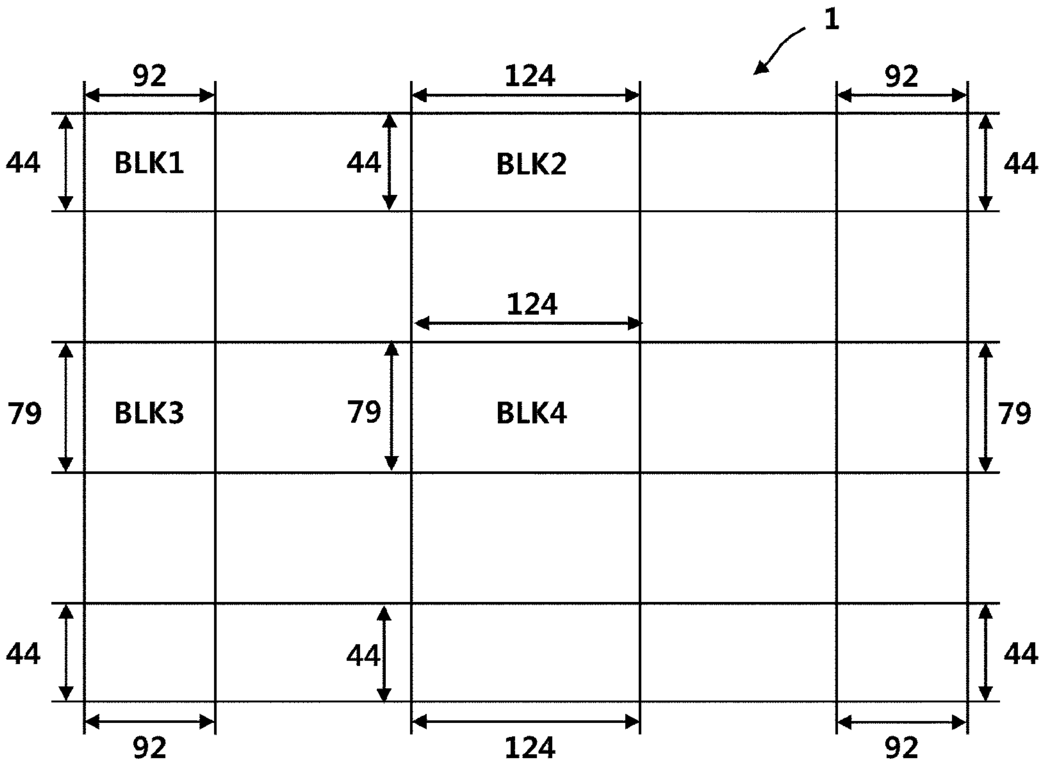
FIG. 5 is an exemplary diagram of screen segmentation for a backlight unit for explaining that the characteristic of the area non-uniformity of a block is reflected in a representative brightness value according to an exemplary embodiment.

FIG. 5 is an exemplary diagram of screen segmentation for a backlight unit for explaining that the characteristic of the area non-uniformity of a block is reflected in a representative brightness value according to an exemplary embodiment.

The non-uniformity remedying circuit of the data analysis circuit may use one factor in order to reflect, in the representative brightness value, the luminance characteristic that appears due to the area non-uniformity between blocks. Here, the area non-uniformity between blocks may be additionally reflected in the corrected representative brightness value in which the relative importance of the black image data is already reflected.

Referring to FIG. 5, blocks of a video image 1, the blocks having the area non-uniformity, are shown.

The video image 1 may be configured by a plurality of blocks having different areas. For example, the video image 1 displayed on a vehicle instrument cluster may be configured by blocks of different areas. The video image 1 may be configured by four types of blocks depending on the area. Here, the numerical value may be "mm" unit or may be omitted. The size of the area may be calculated in terms of width and length. The first block BLK1 may have the first size of 4048 (=92×44), the second block BLK2 may have the second size of 5456 (=124×44), and the third block BLK3 may have the third size of 7268 (=92×79), and the fourth block BLK4 may have the fourth size of 9796 (=124×79).

A plurality of blocks may have different areas depending on the location thereof, for example, near the center, corners, and edges. For example, the first block BLK1 may be positioned at a corner and may have the smallest size. The fourth block BLK4 may be positioned at near the center and may have the largest size. The second block BLK2 and the third block BLK3 may be positioned at the edges and have areas intermediate in size that is larger than the first block BLK1 and smaller than the fourth block BLK4. The second block BLK2 and the third block BLK3 are positioned at the edges, but the area size of the second block BLK2 may be smaller than that of the third block BLK3 depending on the location thereof.

In general, the luminance may be brighter in the fourth block BLK4 positioned at near the center, and the luminance may be darker in the second block BLK2 and the third block BLK3 positioned at the corner and edge. In order to compensate for the luminance non-uniformity, a physical method for increasing the luminance in the second block BLK2 and the third block BLK3 positioned at the corner and edge has been used. However, due to the method, the contrast between the second block BLK2 and the third block BLK3 positioned at the corner and edge may decrease. Accordingly, the difference in luminance may differ in each of the first to fourth blocks BLK1 to 4. Due to the difference in luminance, the black of the second block BLK2 and the third block BLK3 positioned at the corner and edge may be brighter than that at the other places.

In order to correct the difference in luminance due to the area non-uniformity of the block as described above, the non-uniformity remedying circuit of the data analysis circuit may modify the representative brightness value. The non-uniformity remedying circuit may reflect the area non-uniformity of the block in the corrected representative brightness value in which the relative importance of the black image data is reflected.

For example, the non-uniformity remedying circuit may use a variance in order to generate a re-corrected representative brightness value from the corrected representative brightness value. The non-uniformity remedying circuit may obtain the variance by using Equation 2 below and calculate a re-corrected representative brightness value. The APL can be used as a representative brightness value.

[Equation 2]

$$VAR_{BLK} = \frac{1}{n}\sum_{i=0}^{n} x_i^2 - avg^2$$

$$\text{if } VAR_{BLK} = 0: \text{APL\_C2} = \text{APL\_C1}$$

$$\text{if } VAR_{BLK} \neq 0: \text{APL\_C2} = \text{APL\_C1} \cdot G$$

$$\text{G\_BLK1} = \frac{\#\text{ pixels of } BLK1}{\#\text{ pixels of } BLK4}$$

$$\text{G\_BLK2} = \frac{\#\text{ pixels of } BLK2}{\#\text{ pixels of } BLK4}$$

$$\text{G\_BLK3} = \frac{\#\text{ pixels of } BLK3}{\#\text{ pixels of } BLK4}$$

$$\text{G\_BLK4} = \frac{\#\text{ pixels of } BLK4}{\#\text{ pixels of } BLK4}$$

Here, $VAR_{BLK}$ is a variance, n is the total number of pixels in one block, $x_i$ is the brightness data of each pixel, for example, luminance or greyscale, and avg is the average of the brightness data of all pixels in one block. Therefore, if the variance is 0, the non-uniformity remedying circuit may regard, as the re-corrected representative brightness value, the corrected representative brightness value as it as. If the variance is not 0, the non-uniformity remedying circuit may reflect the one factor G in the corrected representative brightness value so as to calculate the re-corrected representative brightness value.

G may be a factor for correcting the area non-uniformity of a block. G may differ depending on the area of each block. In addition, illuminance data ALS may be added to obtain G. G_BLK1, G_BLK2, G_BLK3, and G_BLK4 may be factors used when a representative brightness value is corrected for each of the first to fourth blocks BLK1 to BLK4. Each factor may be a ratio of the area of the corresponding block to the area of the largest block. For example, the first factor G_BLK1 may be a ratio of the number of pixels of the first block (# pixels of BLK1) to the number of pixels of the fourth block (# pixels of BLK4). The fourth factor G_BLK4 may be a ratio of the number of pixels of the fourth block (# pixels of BLK4) to the number of pixels of the fourth block (# pixels of BLK4). The factor may have a value that increase in the direction from the first factor G_BLK1 to the fourth factor G_BLK4).

The non-uniformity remedying circuit may reflect a factor corresponding to a corrected representative brightness value—corrected APL (APL_C1)—in order to obtain a re-corrected representative brightness value—re-corrected APL (APL_C2)—of the corresponding block. Therefore, the re-corrected representative brightness value of the first block BLK1 positioned at the corner is the smallest, the re-corrected representative brightness value of the fourth block BLK4 near the center is the largest, and the re-corrected representative brightness value of the second block BLK2 and the third block BLK3 positioned at the edges may have an intermediate value.

Figure 6:
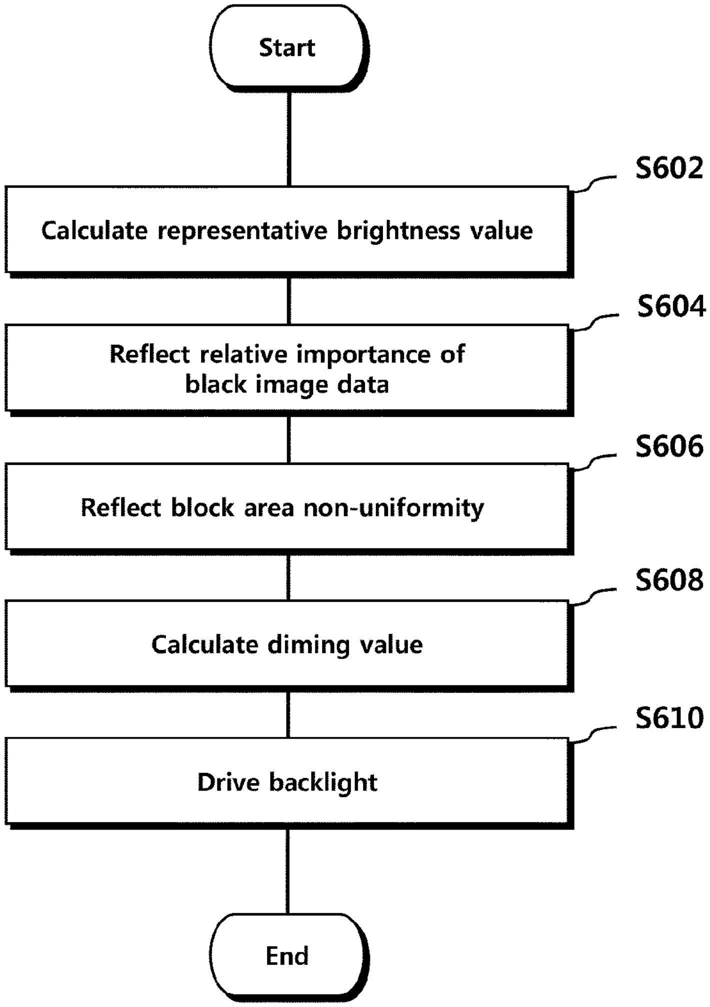
FIG. 6 is a flowchart illustrating local dimming of an image data processing device according to an exemplary embodiment.

FIG. 6 is a flowchart illustrating local dimming of an image data processing device according to an exemplary embodiment.

Referring to FIG. 6, the image data processing device may receive a video image including a plurality of regions, analyze original image data for the video image, and calculate a representative brightness value for one block in operation S602.

The image data processing device may make a histogram of original image data in order to calculate a representative brightness value. In addition, the image data processing device may use CDF data. For example, if the original image data is 8 bits, the image data processing device may calculate histogram data by identifying the frequency for values from 0 to 255. In addition, the image data processing device may calculate CDF data by accumulating the frequency therefor. The image data processing device may calculate the APL based on CDF data.

The image data processing device may generate a first corrected representative brightness value by reflecting, in the representative brightness value, the relative importance of the black image data included in one block in operation S604.

The image data processing device may receive a value of the gamma variable from the outside and adjust the relative importance of the black image data according to the value of the gamma variable. If the value of the gamma variable is less than 1, the image data processing device can enhance the black characteristic by decreasing the corrected representative brightness value. When the value of the gamma variable is greater than 1, the image data processing device can enhance the luminance characteristic by increasing the corrected representative brightness value.

The image data processing device may reflect the area non-uniformity between one block and another block in the first corrected representative brightness value so as to generate a second corrected representative brightness value in operation S606.

The image data processing device may calculate a dimming value for adjusting the brightness of the backlight according to the second corrected representative brightness value in operation S608.

The image data processing device may generate a dimming control signal according to the dimming value and output the dimming control signal to the backlight driving device in operation S610.

Figure 7:
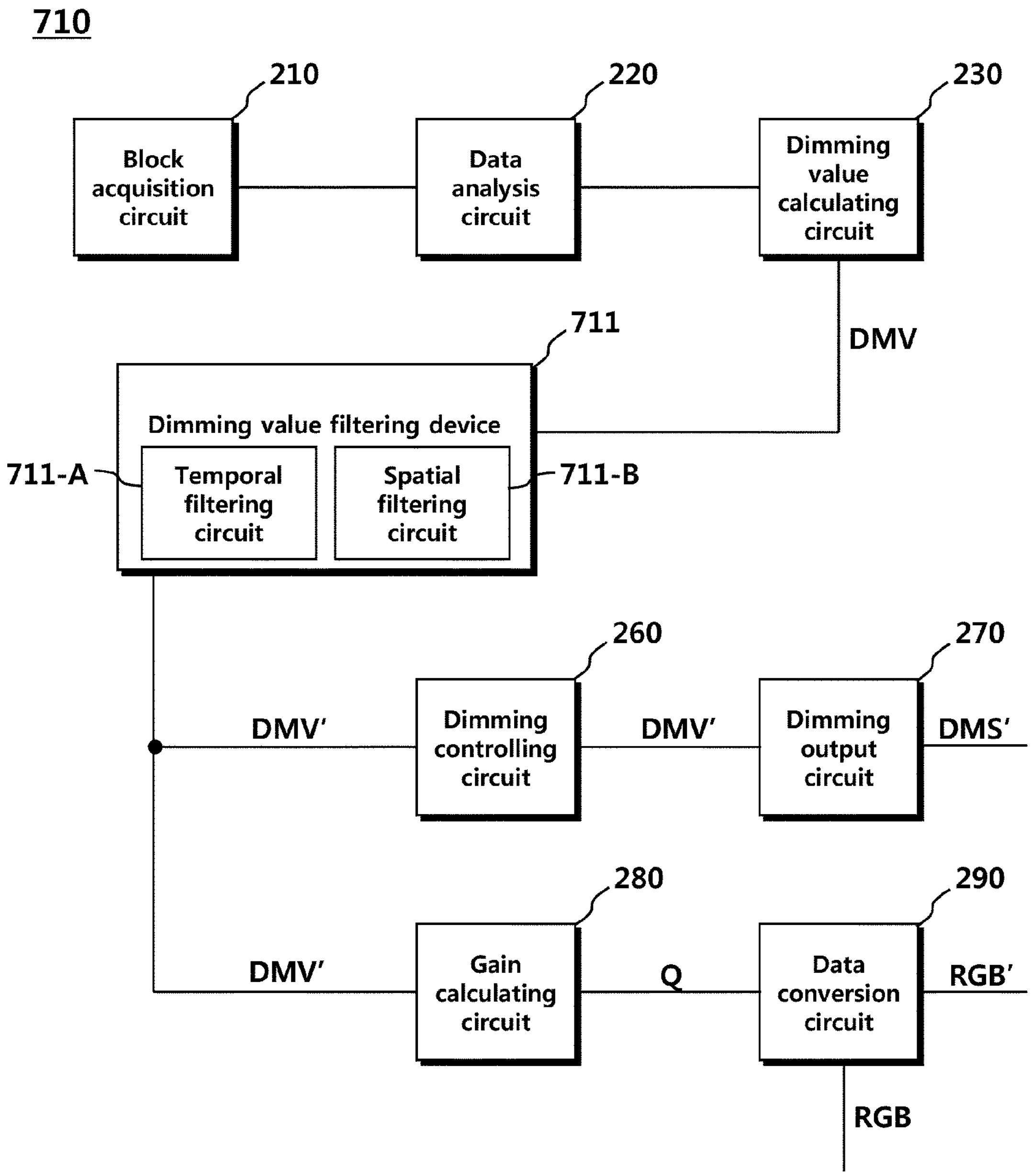
FIG. 7 is a configuration diagram of a dimming value filtering device and an image data processing device including the same according to another embodiment.

FIG. 7 is a configuration diagram of a dimming value filtering device and an image data processing device including the same according to another embodiment.

Referring to FIG. 7, an image data processing device 710 according to another embodiment may include a block acquisition circuit 210, a data analysis circuit 220, a dimming value calculating circuit 230, a dimming controlling circuit 260, a dimming output circuit 270, a gain calculating circuit 280, a data conversion circuit 290, and a dimming value filtering device 711. Here, the block acquisition circuit 210, the data analysis circuit 220, the dimming value calculating circuit 230, the dimming controlling circuit 260, the dimming output circuit 270, the gain calculating circuit 280, and the data conversion circuit 290 may perform the same function as that described above in FIG. 2. In addition, the dimming value filtering device 711 may perform the same function as that of the filtering circuit 240 in FIG. 2 as well as perform a unique function for differential spatial filtering according to a region of a video image. Hereinafter, the unique function will be described.

The dimming value filtering device 711 may include a temporal filtering circuit 711-A and a spatial filtering circuit 711-B. The temporal filtering circuit 711-A may filter a dimming value so that the dimming value is smoothly changed to a target dimming value. The temporal filtering circuit 711-A may smoothly change a dimming value in order to prevent flickering, which occurs when a dimming value of one frame has a large deviation from a dimming value of a previous frame. The spatial filtering circuit 711-B may make the luminance between adjacent regions of the video image to be uniform by adjusting a dimming value deviation between multiple blocks of the video image. The temporal filtering circuit 711-A and the spatial filtering circuit 711-B each include their own components, and may share some components. For example, the temporal filtering circuit 711-A and the spatial filtering circuit 711-B may be controlled by one controlling circuit.

The dimming value filtering device 711 may receive dimming values related to a plurality of blocks of a video image, for example, an initial dimming value (DMV), from the dimming value calculating circuit 230. The dimming value filtering device 711 may differently filter a dimming value for each of a plurality of blocks according to the position of each block in the video image. Here, filtering may be understood as spatial filtering. The dimming value filtering device 711 may output the filtered dimming value DMV' as a result of filtering the dimming value. The filtered dimming value DMV' may be transmitted to the dimming controlling circuit 260 or the gain calculating circuit 280.

Figure 8:
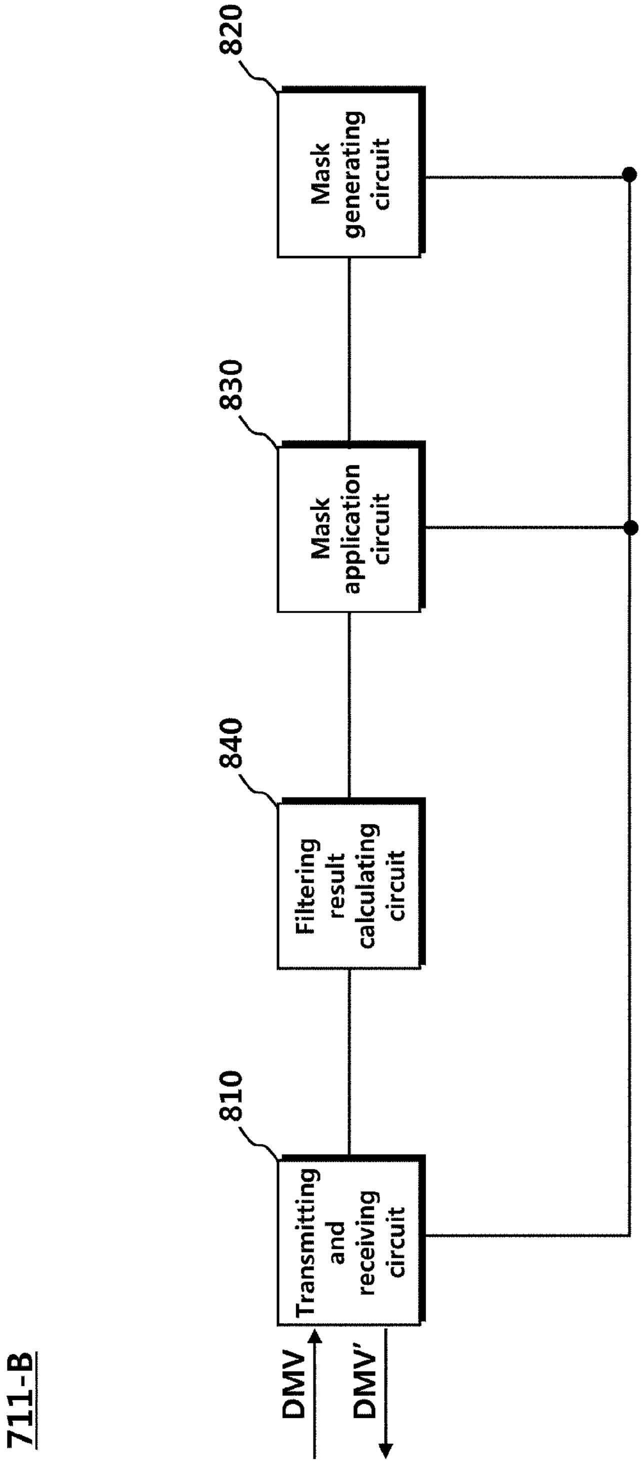
FIG. 8 is a configuration diagram of a spatial filtering circuit of a dimming value filtering device according to another embodiment.

FIG. 8 is a configuration diagram of a dimming value filtering device and an image data processing device including the same according to another embodiment.

Referring to FIG. 8, the spatial filtering circuit 711-B of the dimming value filtering device 711 may include a transmitting and receiving circuit 810, a mask generating circuit 820, a mask application circuit 830, and a filtering result calculating circuit 840. The spatial filtering circuit 711-B of the dimming value filtering device 711 may perform spatial filtering of a dimming value for adjusting the brightness of the backlight, and thus may output the filtered dimming value.

The mask generating circuit 820 may generate a mask including a coefficient. The coefficient may be understood as a factor to be used for computation in connection with a dimming value related to one block of a video image. For example, when the dimming value indicates a duty of the PWM, the coefficient may be a constant equally defining the duty as the dimming value. The mask may change the dimming value of each block while moving the blocks of the video image. In the present disclosure, spatial filtering may be understood as a process in which the mask application circuit 830 performs computation of a coefficient of a mask and a dimming value of a block to generate a new dimming value. The mask may include at least one such coefficient, wherein each coefficient corresponds to one block. For example, the mask may have the form of a matrix. The coefficients are arranged in the space of each matrix, and each coefficient may be calculated corresponding to the dimming value of each block.

In addition, the mask generating circuit 820 may generate a plurality of the masks. That is, the mask generating circuit 820 may generate a plurality of masks of the same type or different types of masks. Here, the different types of masks may include different coefficients or include the same coefficients arranged at different positions. On the other hand, the same type of mask may denote that the coefficients are all the same and the coefficients are arranged at the same position.

The mask application circuit 830 may apply a mask to a block of a video image. To this end, if the mask application circuit 830 applies a mask to correspond to one block, the filtering result calculating circuit 840 may perform computation of a coefficient of the mask and a dimming value of one block. Here, the mask application circuit 830 may apply the mask to correspond to each block while moving the mask along a plurality of blocks of the video image.

In addition, the mask application circuit 830 may select one of a plurality of masks generated by the mask generation circuit 820 according to the positions of the plurality of blocks of the video image, and may apply the selected mask to each block. Here, the mask application circuit 830 may select and apply the same mask or a different mask according to the position of the block. For example, the mask application circuit 830 may apply a first mask to a block positioned at the center of the video image, and may apply a second mask different from the first mask to a block positioned at the corner. Alternatively, the mask application circuit 830 may apply the same first mask to the block positioned at the edge and the block positioned at the corner of the video image.

The filtering result calculating circuit 840 may calculate a filtered dimming value by performing computation of a dimming value related to a plurality of blocks of a video image and a coefficient of a mask. When the mask application circuit 830 applies the mask to correspond to each block while moving the mask along a plurality of blocks, the filtering result calculating circuit 840 may perform computation of a coefficient of the mask and a dimming value of the block. Then, the dimming value may be converted into a filtered dimming value.

The transmitting and receiving circuit 810 may receive a dimming value related to a block from the dimming value calculating circuit 230 of FIG. 7. The transmitting and receiving circuit 810 may transmit the filtered dimming value generated in the spatial filtering circuit 711-B to the dimming controlling circuit 260 of FIG. 7 or the gain calculating circuit 280 of FIG. 7.

Figure 9:
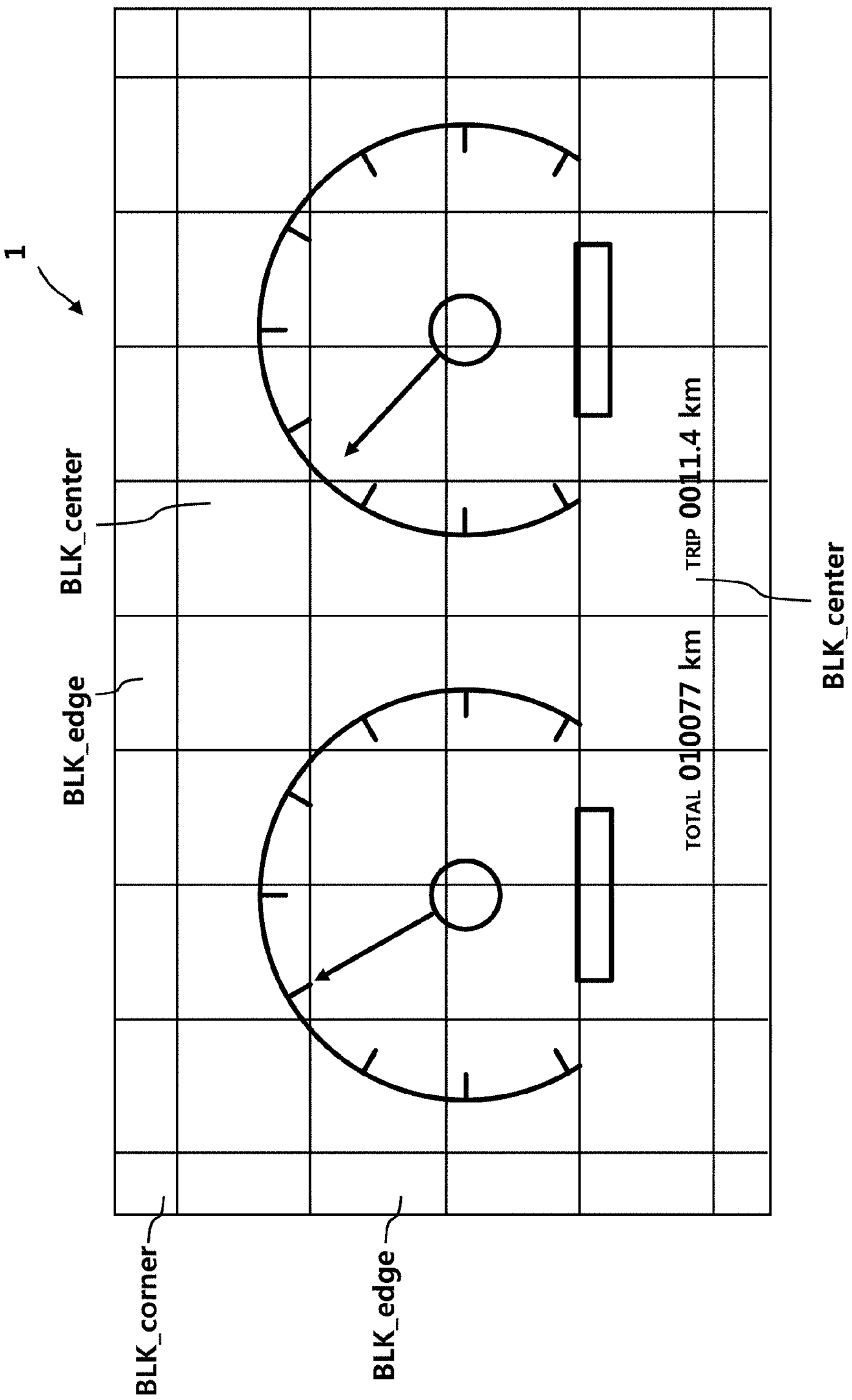
FIG. 9 is an exemplary diagram illustrating a video image and a block included therein according to another exemplary embodiment.

FIG. 9 is an exemplary diagram illustrating a video image and a block included therein according to another embodiment.

Referring to FIG. 9, an example of a video image 1 may be shown. The video image 1 displayed herein may be related to a vehicle instrument cluster.

The image data processing device ma divide the video image 1 into a plurality of regions, and may designate each region as a block. The designated block may be positioned at the center, edge, and corner of the video image 1.

A block, BLK_corner, positioned at the corner may denote a block at the furthest end points of both ends in the diagonal directions of the video image 1. A block, BLK_edge, positioned at the edge may denote a block positioned at a point closest to the boundary of the video image 1, and may include a block positioned between blocks, BLK_corners, positioned at the corners. A block, BLK_center, positioned at the center may denote a block positioned near the center of the video image 1, and may include the remaining blocks, among all blocks, except for the block, BLK_corner, positioned at the corner and the block, BLK_edge, positioned at the edge.

The areas of respective blocks may be different from each other or may be partially different. However, it is not limited thereto, and the area of each of blocks may be identical. The area of each of blocks may differ according to the configuration of the block acquisition circuit of the image data processing device. For example, in FIG. 9, the areas of the block, BLK_corner, positioned at the corner, the block, BLK_edge, positioned at the edge, and the block, BLK_center, positioned at the center may be different. The area of the block, BLK_center, positioned at the center may be the largest, and the area of the block, BLK_corner, positioned at the corner may be the smallest. The area of the block, BLK_edge, positioned at the edge may have an intermediate size of the area of BLK_center and the area of BLK_corner.

FIG. 10 is an exemplary diagram illustrating a mask used for spatial filtering according to another embodiment.

Referring to FIG. 10, an example of a mask may be shown. A mask generating circuit of a dimming value filtering device may generate a plurality of masks. The mask application circuit may select a plurality of different masks for respective blocks and apply the selected mask to the corresponding block.

For example, a plurality of masks may include a corner mask M_corner applied to a block, BLK_corner of FIG. 9, positioned at a corner, an edge mask M_edge applied to a block, BLK_edge of FIG. 9, positioned at the edge, and a center mask M_center applied to a block, BLK_center of FIG. 9, positioned at the center. Then, when a block to be filtered is positioned at one of a corner, an edge, and a center, the mask application circuit may select a mask corresponding to the corresponding position and apply the selected mask to the block to be filtered.

The mask may include a coefficient to be used for computation in connection with a dimming value of a block. The mask may include a plurality of coefficients. The mask is in the form of a matrix, and coefficients may be included in each space of the matrix. When spatial filtering is performed for one block, neighboring blocks adjacent to the one block may also be involved in the computation process. Thus, one coefficient among the plurality of coefficients corresponds to a target block and the other coefficients correspond to neighboring blocks, respectively, and thus may be involved in the computation process. Computation using a plurality of coefficients will be described later.

These coefficients are preconfigured by a user, and data on the configured coefficients may be stored in a storage such as a register.

Accordingly, the coefficients of the mask may be named differently depending on their position in the matrix. A coefficient positioned at the middle of the matrix may be named a center coefficient, a coefficient positioned at the horizontal direction of the center coefficient may be named a horizontal coefficient, a coefficient positioned at the vertical direction of the center coefficient may be named a vertical coefficient, and a coefficient positioned at the diagonal direction of the center coefficient may be named a corner coefficient.

For example, in FIG. 10, in the corner mask M_corner, the center coefficient may be 1, and the horizontal coefficient, the vertical coefficient, and the corner coefficient may be 0. Alternatively, in the edge mask M_edge, the center coefficient may be 0.40, and the horizontal and vertical coefficients may be 0.15. Alternatively, in the center mask M_center, the center coefficient may be 0.36, the horizontal coefficient may be 0.12, the vertical coefficient may be 0.12, and the corner coefficient may be 0.04.

In addition, the center coefficient, the horizontal coefficient, the vertical coefficient, and the corner coefficient may have the same or different values. For example, in the corner mask M_corner, the center coefficient may be different from the horizontal coefficient, the vertical coefficient, and the corner coefficient, but the horizontal coefficient, the vertical coefficient, and the corner coefficient may be the same. In the edge mask M_edge and the center mask M_center, the center coefficient may be different from the horizontal coefficient and the vertical coefficient, but the horizontal coefficient and the vertical coefficient may be the same.

In addition, the center coefficient of a mask may have a larger value than peripheral coefficients, that is, the horizontal coefficient, the vertical coefficient, and the corner coefficient. The mask may make the brightness or luminance of one block to be distinct or obscure in relation to an adjacent block. Here, the center coefficient may have a larger value than the peripheral coefficients. The center coefficient may have a larger value when the brightness or luminance of one block is made distinct than when the same is made obscure.

For example, in the corner mask M_corner, the center coefficient is 1 and the peripheral coefficient is 0, and thus the center coefficient may be larger than the peripheral coefficient. In the edge mask M_edge, the center coefficient is 0.40, the horizontal and vertical coefficients are 0.15, and thus the center coefficient may be larger than the horizontal and vertical coefficients. In the center mask M_center, the center coefficient is 0.36, the horizontal and vertical coefficients are 0.12, the corner coefficient is 0.04, and thus the center coefficient may be larger than the peripheral coefficient.

In addition, the center coefficient may be different for each mask. The center coefficient of the mask applied to the corner and edge of the video image may be larger than the center coefficient of the mask applied to the center of the video image. In addition, the center coefficient of the mask applied to the corner of the video image may be larger than the center coefficient of the mask applied to the edge of the video image.

For example, since a contrast should be high at the corners and edges of the video image and the brightness of one block needs to be distinct, the center coefficient of the corner mask M_corner and the edge mask M_edge may be greater than the center coefficient of the center mask M_center. In addition, the contrast at the corners of the video image should be higher than the contrast at the edges thereof and the brightness of one block should be distinct, and thus the center coefficient of the corner mask M_corner may be greater than the center coefficient of the edge mask M_edge. Accordingly, as shown in FIG. 10, the center coefficient of the corner mask M_corner may be 1, the center coefficient of the edge mask M_edge may be 0.40, and the center coefficient of the center mask M_center may be 0.36.

In addition, in order to make the brightness or luminance of one block to be distinct in relation to an adjacent block, the coefficient may be concentrated at the center of the mask. Accordingly, like the corner mask M_corner, the center coefficient is high, the peripheral coefficient becomes 0, and thus the peripheral coefficient may not exist. On the other hand, in order to make the brightness or luminance of one block to be obscure in relation to an adjacent block, the coefficients may be uniformly distributed over the mask. Therefore, like the center mask M_center, the center coefficient is low and the peripheral coefficient having a non-zero value may exist uniformly.

Figure 11:
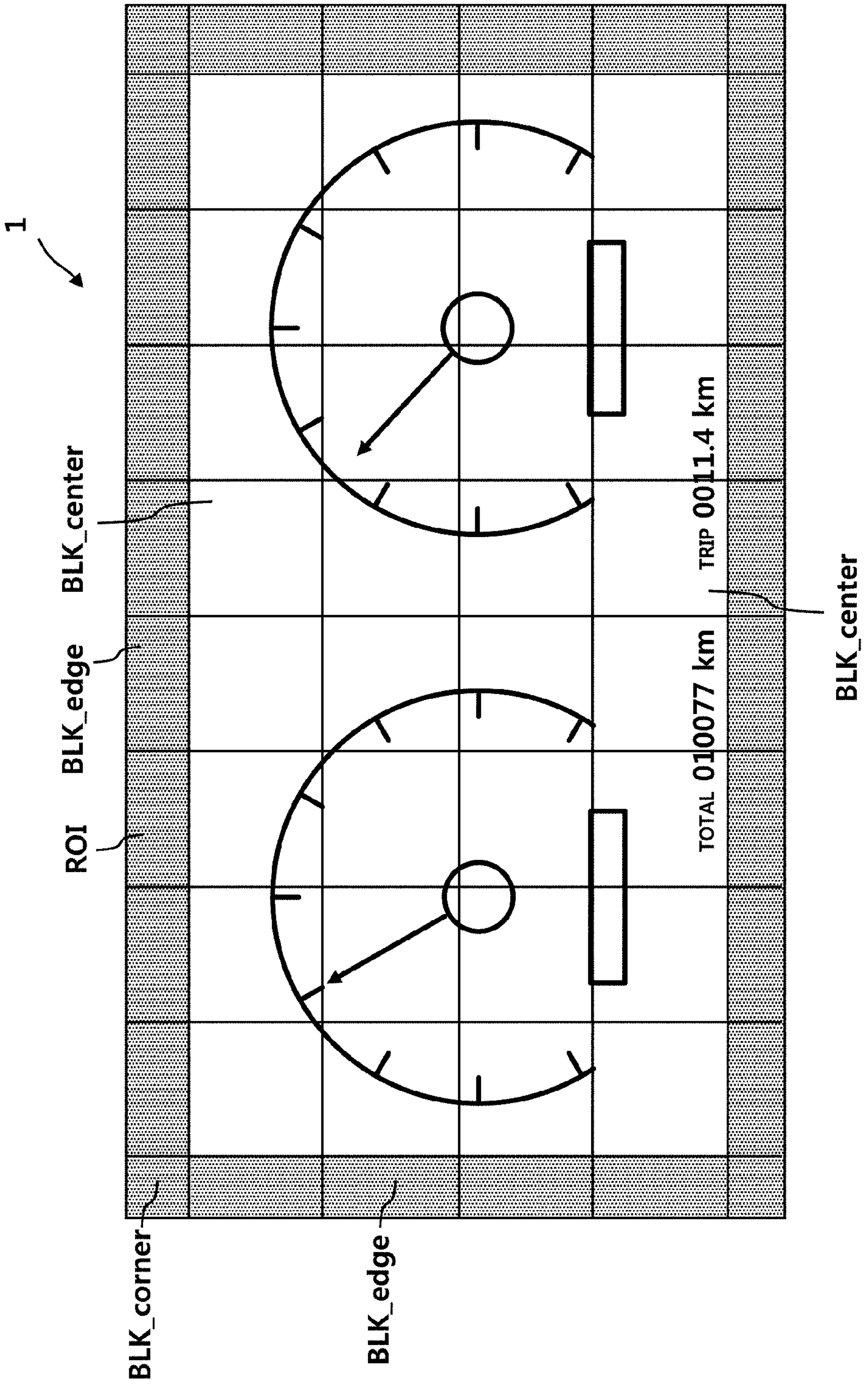
FIG. 11 is a first exemplary diagram illustrating a spatial filtering region according to another exemplary embodiment.

FIG. 11 is a first exemplary diagram illustrating a spatial filtering region according to another embodiment.

Referring to FIG. 11, a region in the video image 1 in which spatial filtering is to be performed may be shown. Hereinafter, such an area may be referred to as a region of interest (ROI) (refer to a pattern region of FIG. 11). The region of interest (ROI) is pre-configured by a user, and data on the configured region of interest ROI may be stored in a storage such as a register.

A dimming value filtering device of an image data processing device may perform spatial filtering on the video image 1 by using a first mask, and may perform spatial filtering on a block in the ROI by using a second mask different from the first mask. Here, the ROI may be understood as a region, having a high contrast and the brightness of one block of which needs to be more distinct than the brightness of an adjacent block. For example, the region of interest ROI may include the corner or edge of the video image 1. In addition, the second mask may include a coefficient configured to increase the contrast of the block. For example, the second mask may be a corner mask or an edge mask.

For example, the dimming value filtering device may perform spatial filtering on all blocks of the video image 1. However, the dimming value filtering device may apply a center mask to the block BLK_center positioned at the center, and apply a mask different from the center mask to the block BLK_corner positioned at the corner and the block BLK_edge positioned at the edge. The dimming value filtering device may apply a corner mask to the block BLK_corner positioned at the corner, and may apply an edge mask to the block BLK_edge positioned at the edge.

Figure 12:
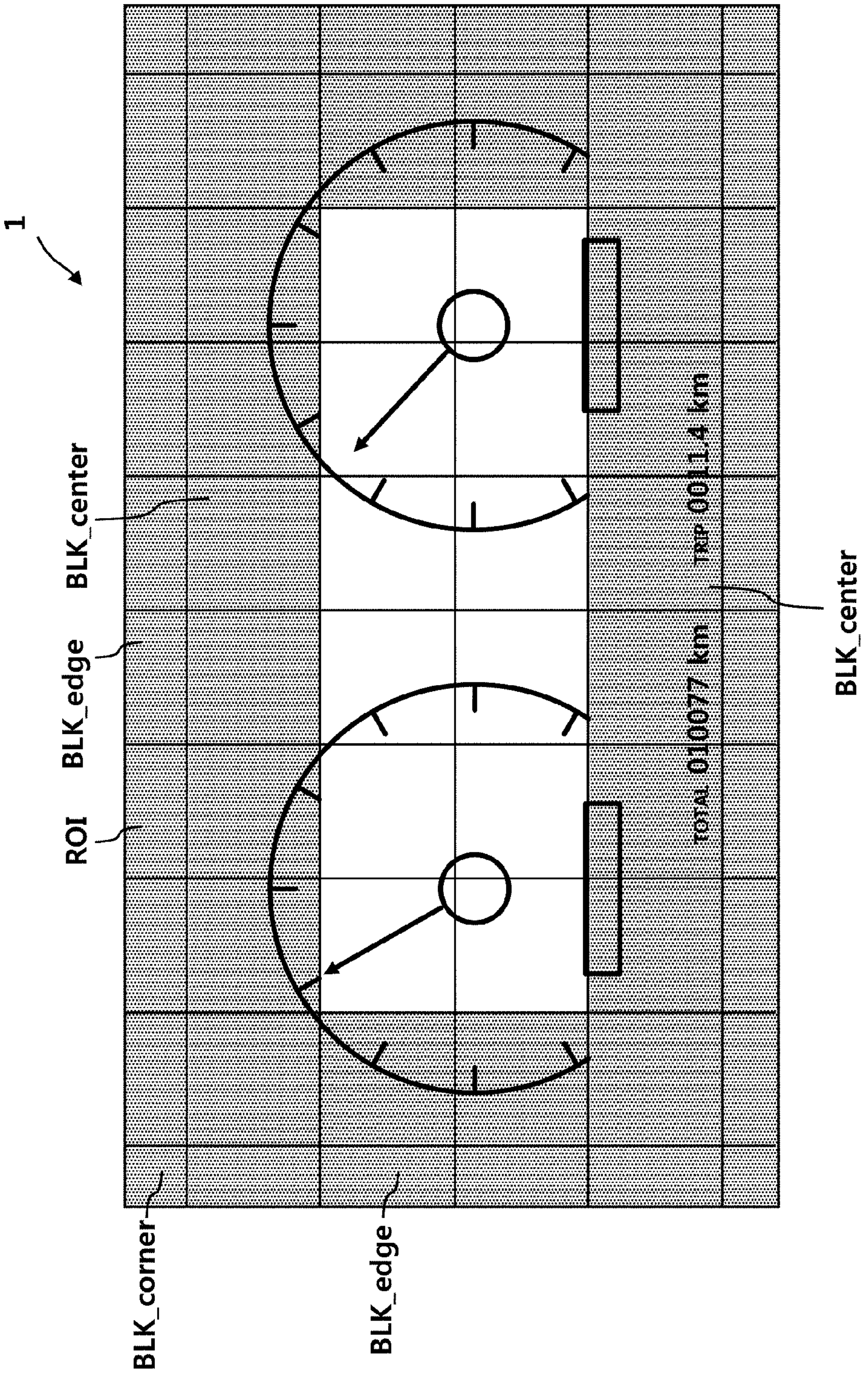
FIG. 12 is a second exemplary diagram illustrating a spatial filtering region according to another exemplary embodiment.

FIG. 12 is a second exemplary diagram illustrating a spatial filtering region according to another embodiment.

Referring to FIG. 12, the region of interest ROI may be changed. The mask application circuit of the dimming value filtering device may change the region of interest ROI according to the configuration stored in a register. The ROI may include a block BLK_corner positioned at a corner and a block BLK_edge positioned at an edge. Additionally, the ROI may further include a part of the block BLK_center positioned at the center.

Then, the mask application circuit of the dimming value filtering device may consider the block BLK_center positioned at the center of the ROI as the block BLK_edge positioned at the edge, and apply an edge mask, instead of the center mask, thereto. If a contrast for the block BLK-_center positioned at the center of the ROI needs to be increased, a corner mask can be applied thereto.

Figure 13:
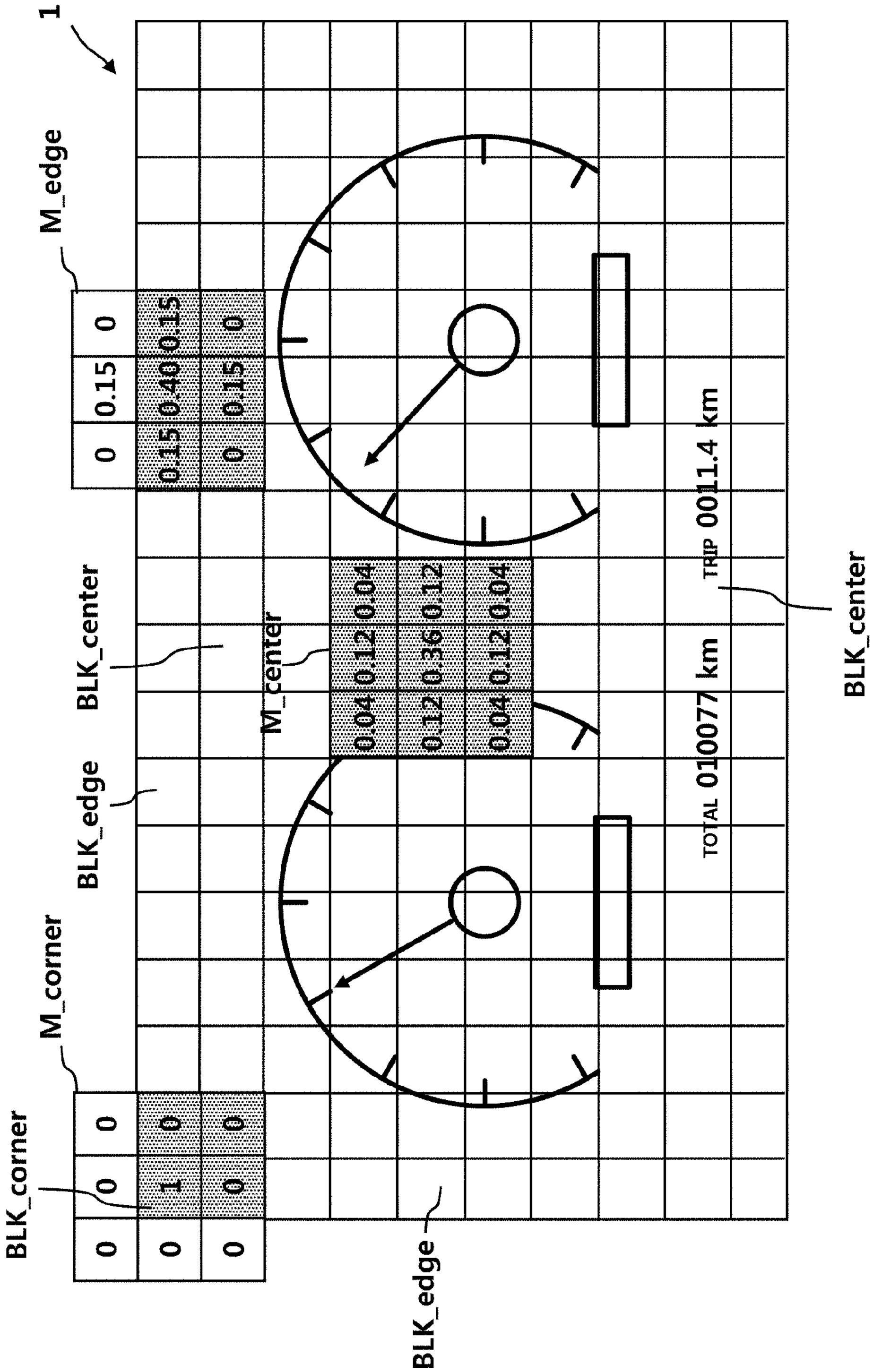
FIG. 13 is a diagram for explaining application of a mask to a block in order to perform spatial filtering according to another embodiment.

FIG. 13 is a diagram for explaining application of a mask to a block for spatial filtering according to another embodiment.

Referring to FIG. 13, the mask application circuit of the dimming value filtering device may select one of a plurality of masks according to a position of a block in a video image and apply the selected mask to the block. Hereinafter, a mask having a plurality of coefficients included in a 3×3 matrix may be described as an example.

The mask application circuit may select and apply a different mask according to the location of the block or the brightness of the block while moving the block of the video image 1. Here, the brightness of the block may include a representative brightness value such as the APL. If one block is positioned at the center, or the APL of one block is high, the mask application circuit may apply a center mask M_center thereto. The center mask M_center is a mask basically used by the mask application circuit for spatial filtering, and may help make the brightness of the block to be obscure. When one block is positioned at a corner or edge, or if the APL of one block is low, the mask application circuit may apply the corner mask M_corner or the edge mask M_edge. The corner mask M_corner or the edge mask M_edge is a mask specially used by the mask application circuit in order to emphasize deep black and increase a contrast, and may help to make the brightness of a block to be distinct.

In addition, a block to which the mask is applied may be referred to as a center block, and blocks adjacent to the center block may be referred to as neighboring blocks. Among the neighboring blocks, a block horizontally adjacent to the center block may be referred to as a horizontal block, a block vertically adjacent to the center block may be referred to as a vertical block, and a block diagonally adjacent to the center block may be referred to as a corner block. In addition, the mask may include a plurality of coefficients in the form of a matrix, the plurality of coefficients corresponding to the center block, the horizontal block, the vertical block, and the corner block.

For example, the mask application circuit may apply the center mask M_center to the block BLK_center positioned at the center. The center mask M_center has a center coefficient of 0.36, a horizontal coefficient of 0.12, a vertical coefficient of 0.12, and a corner coefficient of 0.04 in the form of a 3×3 matrix. Therefore, a block to which the center coefficient of 0.36 is applied may become a center block, a block to which the horizontal coefficient of 0.12 is applied may become a horizontal block, a block to which the vertical coefficient of 0.12 is applied may become a vertical block, and a block to which the corner coefficient of 0.04 is applied may become a corner block (refer to a pattern region in FIG. 13).

In addition, the mask application circuit may apply the edge mask M_edge to the block BLK_edge positioned at the edge. The center mask M_center may have a center coefficient of 0.40, a horizontal coefficient of 0.15, a vertical coefficient of 0.15, and a corner coefficient of 0 in the form of a 3×3 matrix. Therefore, a block to which the center coefficient of 0.40 is applied may become a center block, a block to which the horizontal coefficient of 0.15 is applied may become a horizontal block, a block to which the vertical coefficient of 0.15 is applied may become a vertical block, and a block to which the corner coefficient of 0 is applied may become a corner block (refer to a pattern region in FIG. 13).

In addition, the mask application circuit may apply the corner mask M_corner to the block BLK_corner positioned at the corner. The corner mask M_corner may have a center coefficient of 1, a horizontal coefficient of 0, a vertical coefficient of 0, and a corner coefficient of 0 in the form of a 3×3 matrix. Therefore, a block to which the center coefficient of 1 is applied may become a center block, a block to which the horizontal coefficient of 0 is applied may become a horizontal block, a block to which the vertical coefficient of 0 is applied may become a vertical block, and a block to which the corner coefficient of 0 is applied may become a corner block (refer to a pattern region in FIG. 13).

The filtering result calculating circuit may calculate a filtered dimming value by performing computation of a dimming value related to a block and the coefficient. The filtering result calculating circuit may calculate a filtered dimming value by performing computation of a mask coefficient in connection with a dimming value related to the center block and a dimming value related to a neighboring block. Here, the filtered dimming value may be understood as a result obtained by performing spatial filtering for the center block. In order to calculate the filtered dimming value related to the center block, the filtering result calculating circuit may reflect a result obtained by performing computation of the dimming value and coefficient related to the neighboring block. Specifically, the filtering result calculating circuit may calculate the filtered dimming value through Equation 3 below.

$$PWM_{new}(x,y,n)=\alpha_{cen}(PWM_i(x,y,n))+\alpha_{hor}(PWM_i(x-1,y,n)+PWM_i(x+1,y,n))+\alpha_{ver}(PWM_i(x,y-1,n)+PWM_i(x,y+1,n))+\alpha_{cor}(PWM_i(x-1,y-1,n)+PWM_i(x-1,y+1,n)+PWM_i(x+1,y-1,n)+PWM_i(x+1,n))$$

$$PWM_{sf}(x,y,n)=\max(PWM_i(x,y,n),PWM_{new}(x,y,n)) \quad \text{[Equation 3]}$$

The filtering result calculating circuit may multiply the dimming value ($PWM_i$(x,y,n)) and the center coefficient $\alpha_{cen}$ of the center block, multiply the dimming value ($PWM_i$(x−1,y,n), $PWM_i$(x+1,y,n)) and the horizontal coefficient $\alpha_{hor}$ of the horizontal block, multiply the dimming value ($PWM_i$(x,y−1,n), $PWM_i$(x,y+1,n)) and the vertical coefficient $\alpha_{ver}$ of the vertical block, and multiply the dimming value ($PWM_i$(x−1,y−1,n), $PWM_i$(x−1,y+1,n), $PWM_i$(x+1,y−1,n), $PWM_i$(x+1,y+1,n)) and the corner coefficient $\alpha_{cor}$ of the corner block. The filtering result calculating circuit may calculate a new dimming value ($PWM_{new}$(x,y,n)) by summing all the results of the multiplication. Here, x and y denote coordinates relating to the center block, horizontal block, vertical block, and corner block corresponding to the mask, and n may denote the number of blocks to which the mask is applied. In a case of the center mask M_center, the center coefficient $\alpha_{cen}$ may be 0.36, the horizontal coefficient $\alpha_{hor}$ and the vertical coefficient $\alpha_{ver}$ may be 0.12, and the corner coefficient $\alpha_{cor}$ may be 0.04.

Further, the filtering result calculating circuit compares the result of the computation with the dimming value ($PWM_i$(x,y,n)) of the center block, and if the result of the computation is larger than the dimming value of the center block, the filtering result calculating circuit may output the result of the computation as the filtered dimming value. Alternatively, if the result of the computation is smaller than the dimming value of the center block, the filtering result calculating circuit may output the dimming value ($PWM_i$(x,y,n)) of the center block as the filtered dimming value. That is, the filtering result calculating circuit may determine and output the dimming value, having the maximum value among the new dimming value ($PWM_{new}$(x,y,n)) and the dimming value ($PWM_i$(x,y,n)) of the center block, as the filtered dimming value.

On the other hand, the dimming value filtering device may designate a region of interest that needs a high contrast, may apply a basic filter—the center mask M_center—in relation to blocks located outside the region of interest, and may apply a special filter—the corner mask M_corner or edge mask M_edge—in relation to blocks located within the region of interest. Therefore, if the center mask M_center is applied, a difference between a dimming value related to a block located outside the ROI and a dimming value related to an adjacent block may become small. When the corner mask M_corner or edge mask M_edge is applied, a difference between a dimming value related to a block located outside the ROI and a dimming value related to an adjacent block may become large. In addition, when the corner mask (M_corner) is applied, the difference between the dimming value related to a block located outside the ROI and the dimming value related to an adjacent block may be larger than when the edge mask (M_edge) is applied.

Figure 14:
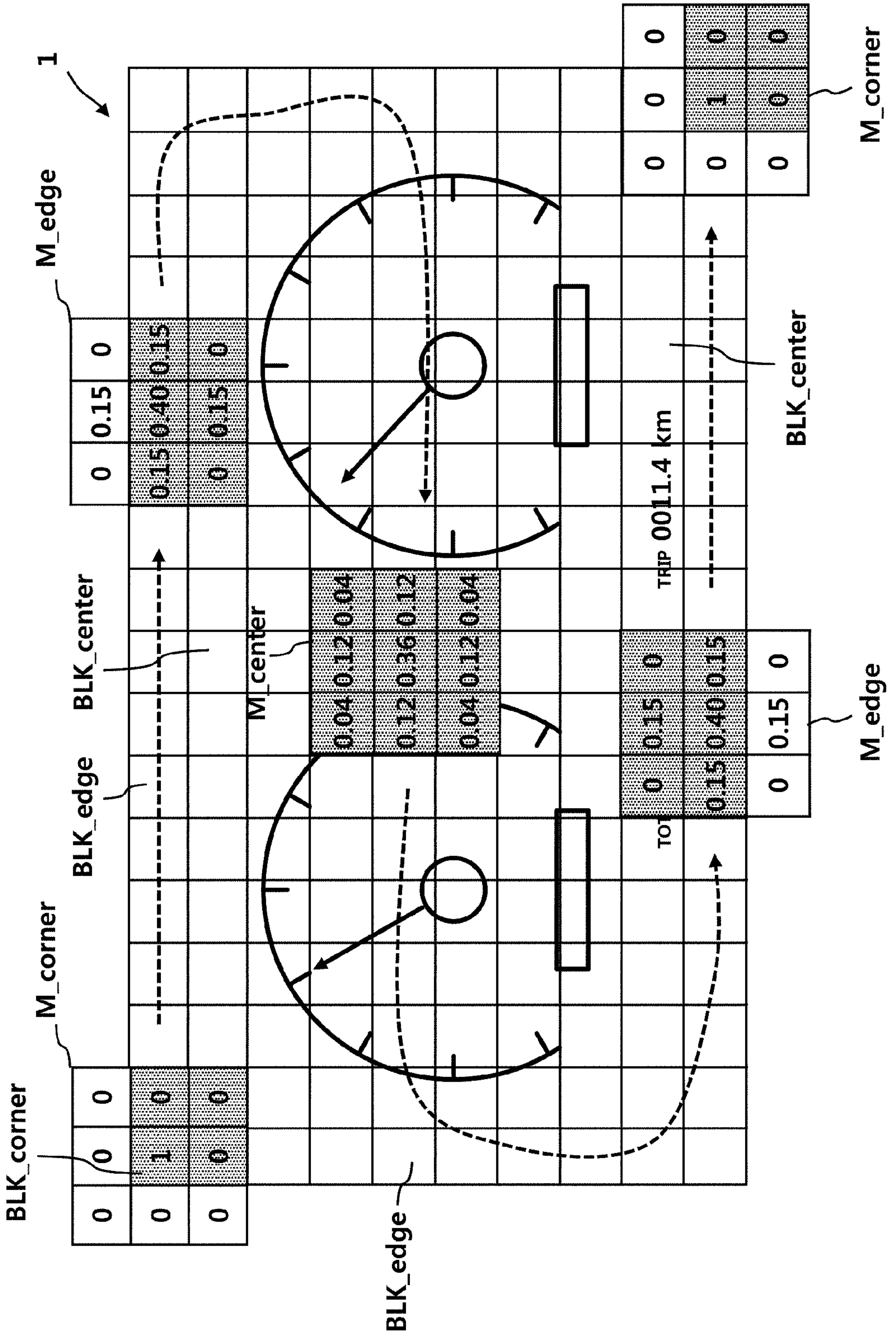
FIG. 14 is a diagram for explaining moving a mask in order to apply the mask to a block according to another exemplary embodiment.

FIG. 14 is a diagram for explaining moving a mask in order to apply a mask to a block according to another exemplary embodiment.

Referring to FIG. 14, the mask application circuit may select and apply a different mask according to the location of a block or the brightness of a block while moving a block of the video image 1. The mask application circuit may sequentially detect blocks of the video image 1 in one direction and perform spatial filtering therefor.

For example, the mask application circuit may sequentially detect blocks of the video image 1 in a zigzag direction (refer to dotted line). The mask application circuit may apply the corner mask M_corner to the block BLK_corner positioned at the corner while moving near the corner of the video image 1. The mask application circuit may apply the edge mask M_edge to the block BLK_edge positioned at the edge while moving near the edge of the video image 1. The mask application circuit may apply the center mask M_center to the block BLK_center positioned at the center while moving near the center of the video image 1.

Figure 15:
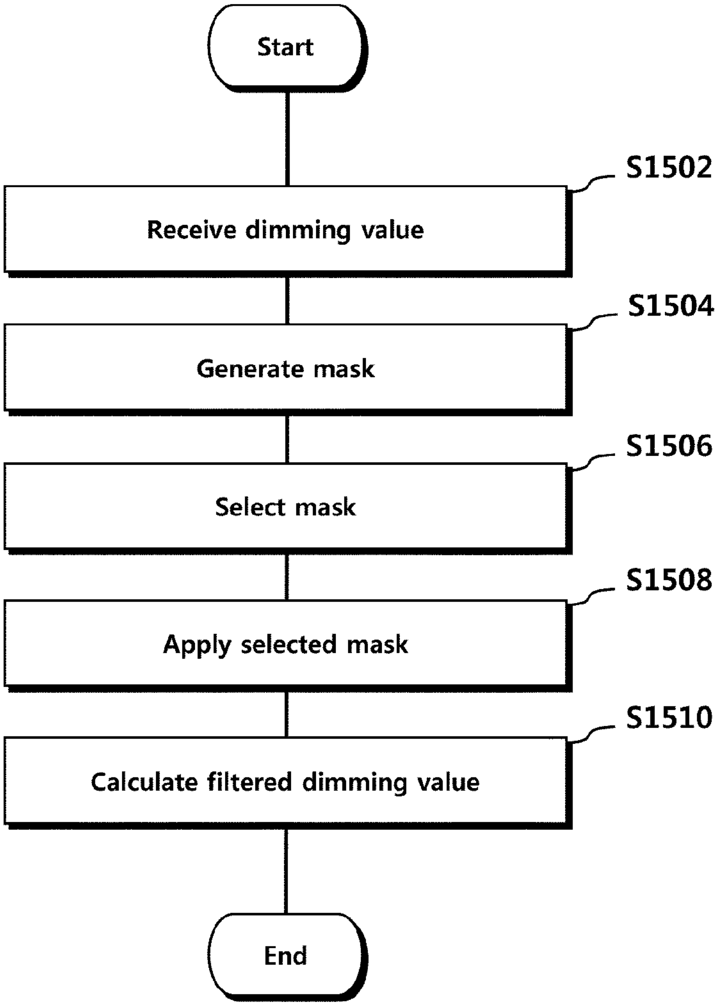
FIG. 15 is a flowchart illustrating spatial filtering of an image data processing device according to another embodiment.

FIG. 15 is a flowchart illustrating spatial filtering of an image data processing device according to another embodiment.

Referring to FIG. 15, a dimming value filtering device of an image data processing device may receive a dimming value from a dimming value calculating circuit. The dimming value calculating circuit may calculate a brightness value of a block of a video image, and may calculate a dimming value according to the brightness value. The dimming value may be data for adjusting the brightness of a backlight in operation S1502. The dimming value filtering device may generate a plurality of masks including coefficients in operation S1504. The dimming value filtering device may select one of the plurality of masks according to the position of the block of the video image in operation S1506. The dimming value filtering device may apply the selected mask to one block for which spatial filtering is to be performed, in operation S1508. The dimming value filtering device may calculate a filtered dimming value by performing computation of dimming values and coefficients related to the one block and neighboring blocks of the one block in operation S1510.

What is claimed is:

1. A dimming value filtering device for spatially filtering dimming values for adjusting brightness of blocks of a backlight, the device comprising:

a mask generating circuit configured to generate a first mask and a second mask from among a plurality of masks different from each other;

a mask application circuit configured to apply the first mask to first blocks corresponding to a center of the backlight and apply the second mask to second blocks corresponding to a corner or an edge of the backlight;

a filtering result calculating circuit configured to calculate a filtered dimming value; and a transmitting and receiving circuit configured to transmit the filtered dimming value, wherein the plurality of masks comprise a center mask applied to a block positioned at a center of a video image, edge masks applied to blocks positioned at edges of the video image, and corner masks applied to blocks positioned at corners of the video image, and a center coefficient of the center mask has a smaller value than a center coefficient of each of the edge masks or a center coefficient of each of the corner masks.

2. The device of claim 1, wherein the center coefficient of each of the edge masks has a smaller value than the center coefficient of each of the corner masks.

3. The device of claim 1, wherein each of the plurality of masks comprises a plurality of coefficients and the filtering result calculating circuit is configured to use the plurality of coefficients to calculate a filtered dimming value for each of the first blocks and each of the second blocks.

4. The device of claim 1, wherein each of the plurality of masks comprises a plurality of coefficients corresponding to a center block and neighboring blocks adjacent to the center block, and the filtering result calculating circuit is configured to:

calculate the filtered dimming value by performing an arithmetic operation with respect to dimming values of the center block and the neighboring blocks based on the plurality of coefficients, and compare a result of the arithmetic operation with an initial dimming value.

5. The device of claim 4, wherein if the result of the arithmetic operation is larger than the initial dimming value, the filtering result calculating circuit is configured to output the result of the arithmetic operation as the filtered dimming value.

6. The device of claim 5, wherein if the result of the arithmetic operation is smaller than the initial dimming value, the filtering result calculating circuit is configured to output the initial dimming value as the filtered dimming value.

7. The device of claim 6, wherein the neighboring blocks comprise horizontal blocks horizontally adjacent to the center block, vertical blocks vertically adjacent to the center block, and corner blocks diagonally adjacent to the center block.

8. The device of claim 7, wherein the plurality of coefficients comprises a center coefficient corresponding to the center block, horizontal coefficients corresponding to the horizontal blocks, vertical coefficients corresponding to the vertical blocks, and corner coefficients corresponding to the corner blocks.

9. The device of claim 8, wherein the center coefficient has a value greater than the horizontal coefficients, the vertical coefficients, and the corner coefficients.

10. The device of claim 9, wherein the filtering result calculating circuit is configured to calculate the filtered dimming value by:

multiplying the dimming value of the center block by the center coefficient, respectively multiplying the dimming values of the horizontal blocks by the horizontal coefficients, respectively multiplying the dimming values of the vertical blocks by the vertical coefficients, respectively multiplying the dimming values of the corner blocks by the corner coefficients, and subsequently summing up all the results of the above multiplications.

11. The device of claim 1, wherein the mask application circuit is configured to designate a region, for which filtering is to be performed, in the video image and apply one of the plurality of masks to a block included in the region.

12. The device of claim 11, wherein the mask application circuit is configured to apply different masks to respective blocks included in the region according to positions of the respective blocks included in the region.

13. The device of claim 11, wherein the region is previously determined and stored.

14. An image data processing device comprising:

a block acquisition circuit configured to divide a video image into a plurality of regions and to designate each region as a block;

a dimming value calculating circuit configured to calculate a brightness value of each block and to calculate a dimming value for adjusting brightness of a backlight corresponding to a block according to the brightness value;

a dimming value filtering device configured to receive the dimming value; and a dimming output circuit configured to output a dimming control signal, for driving the backlight according to the dimming value, to a backlight driving device, wherein the dimming value filtering device is configured to designate a region of interest and filter a dimming value of a block positioned outside the region of interest such that differences between the dimming value of the block positioned outside the region of interest and dimming values of adjacent neighboring blocks decrease, and wherein the dimming value filtering device is configured to generate a first mask and a second mask from among a plurality of masks, to apply the first mask based on a first coefficient to first blocks corresponding to a center of the backlight and apply the second mask based on a second coefficient different from the first coefficient to second blocks corresponding to a corner or an edge of the backlight to calculate a filtered dimming value.

15. The device of claim 14, further comprising:

a data analysis circuit configured to calculate a representative brightness value for each block;

a light amount calculating circuit configured to calculate an amount of light by using the filtered dimming value;

a gain calculating circuit configured to calculate a gain for compensating according to the dimming value; and a data conversion circuit configured to generate a converted image data by using the gain.

16. The device of claim 15, wherein the light amount calculating circuit is configured to calculate a light amount of the backlight and to transmit the calculated light amount to the gain calculating circuit.

17. The device of claim 14, wherein the dimming value filtering device is configured to filter a dimming value of a block included in the region of interest such that differences between the dimming value of the block positioned within the region of interest and dimming values of adjacent neighboring blocks increase.

18. A display device for controlling local dimming comprising:

a host configured to generate an image data or a dimming control signal;

an image data processing device configured to convert the image data and adjust the dimming control signal;

a data driving device configured to supply a data voltage corresponding to the image data;

a gate driving device configured to transmit a scan signal to a gate line; and a backlight driving device configured to control brightness of light sources, wherein the image data processing device comprises;

a block acquisition circuit configured to divide a video image into a plurality of regions and to designate each region as a block;

a dimming value calculating circuit configured to calculate a brightness value of each block and to calculate a dimming value for adjusting brightness of a backlight corresponding to a block according to the brightness value;

a dimming value filtering device configured to receive the dimming value; and a dimming output circuit configured to output a dimming control signal, for driving the backlight according to the dimming value, to a backlight driving device, wherein the dimming value filtering device is configured to designate a region of interest and filter a dimming value of a block positioned outside the region of interest such that differences between the dimming value of the block positioned outside the region of interest and dimming values of adjacent neighboring blocks decrease, wherein the dimming value filtering device is configured to filter a dimming value of a block included in the region of interest such that differences between the dimming value of the block positioned within the region of interest and dimming values of adjacent neighboring blocks increase, and/or wherein the dimming value filtering device is configured to generate a first mask and a second mask from among a plurality of masks, to apply the first mask based on a first coefficient to first blocks corresponding to a center of the backlight and apply the second mask based on a second coefficient different from the first coefficient to second blocks corresponding to a corner or an edge of the backlight to calculate a filtered dimming value.

* * * * *